(12) United States Patent
Gonion et al.

(10) Patent No.: US 11,630,789 B2
(45) Date of Patent: Apr. 18, 2023

(54) SCALABLE INTERRUPTS

(71) Applicant: Apple Inc., Cupertino, CA (US)

(72) Inventors: Jeffrey E. Gonion, Campbell, CA (US); Charles E. Tucker, Campbell, CA (US); Tal Kuzi, Tel Aviv (IL); Richard F. Russo, San Jose, CA (US); Mridul Agarwal, Sunnyvale, CA (US); Christopher M. Tsay, Austin, TX (US); Gideon N. Levinsky, Cedar Park, TX (US); Shih-Chieh Wen, San Jose, CA (US); Lior Zimet, Kerem Maharal (IL)

(73) Assignee: Apple Inc., Cupertino, CA (US)

( * ) Notice: Subject to any disclaimer, the term of this patent is extended or adjusted under 35 U.S.C. 154(b) by 39 days.

(21) Appl. No.: 17/246,311

(22) Filed: Apr. 30, 2021

(65) Prior Publication Data

US 2022/0083484 A1 Mar. 17, 2022

Related U.S. Application Data

(60) Provisional application No. 63/077,375, filed on Sep. 11, 2020.

(51) Int. Cl.
  *G06F 13/24* (2006.01)
  *G06F 1/26* (2006.01)

(52) U.S. Cl.
  CPC ............... *G06F 13/24* (2013.01); *G06F 1/26* (2013.01)

(58) Field of Classification Search
  CPC .................................. G06F 13/24; G06F 1/26
  See application file for complete search history.

(56) References Cited

U.S. PATENT DOCUMENTS 7,721,035 B2    5/2010  Utsumi
8,260,996 B2 *  9/2012  Wolfe ................... G06F 9/4812
                                                    710/267

(Continued)

FOREIGN PATENT DOCUMENTS

CN        100349147       11/2007
EP        2463781 A2      6/2011

(Continued)

OTHER PUBLICATIONS

SRWO, PCT/US2021/049780, Dec. 20, 2021, 18 pages.

*Primary Examiner* — Henry Tsai
*Assistant Examiner* — Christopher A Daley
(74) *Attorney, Agent, or Firm* — Kowert, Hood, Munyon, Rankin & Goetzel, P.C.

(57) ABSTRACT

An interrupt delivery mechanism for a system includes and interrupt controller and a plurality of cluster interrupt controllers coupled to respective pluralities of processors in an embodiment. The interrupt controller may serially transmit an interrupt request to respective cluster interrupt controllers, which may acknowledge (Ack) or non-acknowledge (Nack) the interrupt based on attempting to deliver the interrupt to processors to which the cluster interrupt controller is coupled. In a soft iteration, the cluster interrupt controller may attempt to deliver the interrupt to processors that are powered on, without attempting to power on processors that are powered off. If the soft iteration does not result in an Ack response from one of the plurality of cluster interrupt controllers, a hard iteration may be performed in which the powered-off processors may be powered on.

20 Claims, 14 Drawing Sheets

(56) References Cited

U.S. PATENT DOCUMENTS

| | | | |
|---|---|---|---|
| 8,458,386 B2* | 6/2013 | Smith | G06F 13/24 |
| | | | 710/262 |
| 8,959,270 B2* | 2/2015 | de Cesare | G06F 13/24 |
| | | | 710/267 |
| 9,009,368 B2 | 4/2015 | White | |
| 9,442,869 B2 | 9/2016 | Easwaran | |
| 9,678,564 B2* | 6/2017 | Fatemi | G06F 13/24 |
| 9,747,225 B2* | 8/2017 | Ozguner | G06F 13/1668 |
| 10,585,826 B2* | 3/2020 | Jayasena | G06F 13/24 |
| 11,327,786 B2* | 5/2022 | Hay | G06F 9/45558 |
| 2010/0095039 A1* | 4/2010 | Marietta | G06F 13/24 |
| | | | 710/264 |
| 2010/0274941 A1 | 10/2010 | Wolfe | |
| 2012/0089761 A1* | 4/2012 | Ryu | G06F 13/24 |
| | | | 710/267 |
| 2014/0022263 A1 | 1/2014 | Hartog et al. | |
| 2015/0113193 A1 | 4/2015 | De Cesare | |
| 2016/0140064 A1* | 5/2016 | Chin | G06F 1/08 |
| | | | 710/119 |
| 2020/0301860 A1* | 9/2020 | Hsu | G06F 1/3293 |

FOREIGN PATENT DOCUMENTS

| | | | |
|---|---|---|---|
| EP | 2490100 A1 | 8/2012 | |
| EP | 3198460 A1 | 8/2017 | |

\* cited by examiner

Computer Accessible Storage Medium 800

SOC 804

FIG. 14

SCALABLE INTERRUPTS

This application claims benefit of priority to U.S. Provisional Patent Application Ser. No. 63/077,375, filed on Sep. 11, 2020, which is incorporated herein by reference in its entirety. To the extent that anything in the provisional application conflicts with material expressly set forth herein, the material expressly set forth herein controls.

BACKGROUND

Technical Field

Embodiments described herein are related to interrupts in computing systems and, more particularly, to distributing interrupts to processors for servicing.

Description of the Related Art

Computing systems generally include one or more processors that serve as central processing units (CPUs), along with one or more peripherals that implement various hardware functions. The CPUs execute the control software (e.g., an operating system) that controls operation of the various peripherals. The CPUs can also execute applications, which provide user functionality in the system. Additionally, the CPUs can execute software that interacts with the peripherals and performs various services on the peripheral's behalf. Other processors that are not used as CPUs in the system (e.g., processors integrated into some peripherals) can also execute such software for peripherals.

The peripherals can cause the processors to execute software on their behalf using interrupts. Generally, the peripherals issue an interrupt, typically by asserting an interrupt signal to an interrupt controller that controls the interrupts going to the processors. The interrupt causes the processor to stop executing its current software task, saving state for the task so that it can be resumed later. The processor can load state related to the interrupt, and begin execution of an interrupt service routine. The interrupt service routine can be driver code for the peripheral, or may transfer execution to the driver code as needed. Generally, driver code is code provided for a peripheral device to be executed by the processor, to control and/or configure the peripheral device.

The latency from assertion of the interrupt to the servicing of the interrupt can be important to performance and even functionality in a system. Additionally, efficient determination of which CPU will service the interrupt and delivering the interrupt with minimal perturbation of the rest of the system may be important to both performance and maintaining low power consumption in the system. As the number or processors in a system increases, efficiently and effectively scaling the interrupt delivery is even more important.

BRIEF DESCRIPTION OF THE DRAWINGS

The following detailed description refers to the accompanying drawings, which are now briefly described.

FIG. 14 is a block diagram of a computer accessible storage medium.

Figure 1:
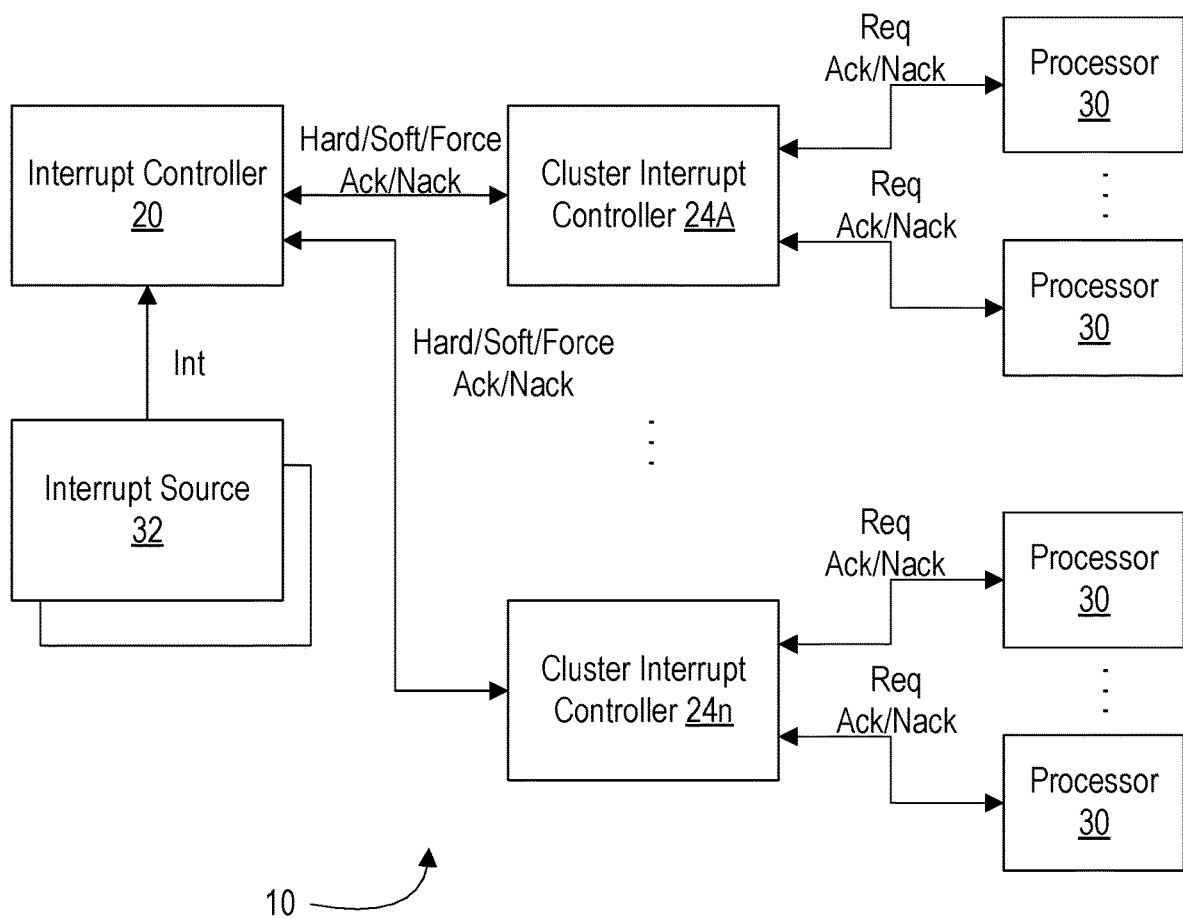
FIG. 1 is a block diagram of one embodiment of a system including an interrupt controller and a plurality of cluster interrupt controllers corresponding a plurality of clusters of processors.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

Turning now to FIG. 1, a block diagram of one embodiment of a portion of a system 10 including an interrupt controller 20 coupled to a plurality of cluster interrupt controllers 24A-24n is shown. Each of the plurality of cluster interrupt controllers 24A-24n is coupled to a respective plurality of processors 30 (e.g., a processor cluster). The interrupt controller 20 is coupled to a plurality of interrupt sources 32.

When at least one interrupt has been received by the interrupt controller 20, the interrupt controller 20 may be configured to attempt to deliver the interrupt (e.g., to a processor 30 to service the interrupt by executing software to record the interrupt for further servicing by an interrupt service routine and/or to provide the processing requested by the interrupt via the interrupt service routine). In system 10, the interrupt controller 20 may attempt to deliver interrupts through the cluster interrupt controllers 24A-24n. Each cluster controller 24A-24n is associated with a processor cluster, and may attempt to deliver the interrupt to processors 30 in the respective plurality of processors forming the cluster.

More particularly, the interrupt controller 20 may be configured to attempt to deliver the interrupt in a plurality of iterations over the cluster interrupt controllers 24A-24n. The interface between the interrupt controller 20 and each interrupt controller 24A-24n may include a request/acknowledge (Ack)/non-acknowledge (Nack) structure. For example, the requests may be identified by iteration: soft, hard, and force in the illustrated embodiment. An initial iteration (the "soft" iteration) may be signaled by asserting the soft request. The next iteration (the "hard" iteration) may be signaled by asserting the hard request. The last iteration (the "force" iteration) may be signaled by asserting the force request. A given cluster interrupt controller 24A-24n may respond to the soft and hard iterations with an Ack response (indicating that a processor 30 in the processor cluster associated with the given cluster interrupt controller 24A-24n has accepted the interrupt and will process at least one interrupt) or a Nack response (indicating that the processors 30 in the processor cluster have refused the interrupt). The force iteration may not use the Ack/Nack responses, but rather may continue to request interrupts until the interrupts are serviced as will be discussed in more detail below.

The cluster interrupt controllers 24A-24n may use a request/Ack/Nack structure with the processors 30 as well, attempting to deliver the interrupt to a given processor 30. Based on the request from the cluster interrupt controller 24A-24n, the given processor 30 may be configured to determine if the given processor 30 is able to interrupt current instruction execution within a predetermined period of time. If the given processor 30 is able to commit to interrupt within the period of time, the given processor 30 may be configured to assert an Ack response. If the given processor 30 is not able to commit to the interrupt, the given processor 30 may be configured to assert a Nack response. The cluster interrupt controller 24A-24n may be configured to assert the Ack response to the interrupt controller 20 if at least one processor asserts the Ack response to the cluster interrupt controller 24A-24n, and may be configured to assert the Nack response if the processors 30 assert the Nack response in a given iteration.

Using the request/Ack/Nack structure may provide a rapid indication of whether or not the interrupt is being accepted by the receiver of the request (e.g., the cluster interrupt controller 24A-24n or the processor 30, depending on the interface), in an embodiment. The indication may be more rapid than a timeout, for example, in an embodiment. Additionally, the tiered structure of the cluster interrupt controllers 24A-24n and the interrupt controller 20 may be more scalable to larger numbers of processors in a system 10 (e.g., multiple processor clusters), in an embodiment.

An iteration over the cluster interrupt controllers 24A-24n may include an attempt to deliver the interrupt through at least a subset of the cluster interrupt controllers 24A-24n, up to all of the cluster interrupt controllers 24A-24n. An iteration may proceed in any desired fashion. For example, in one embodiment, the interrupt controller 20 may be configured to serially assert interrupt requests to respective cluster interrupt controllers 24A-24n, terminated by an Ack response from one of the cluster interrupt controllers 24A-24n (and a lack of additional pending interrupts, in an embodiment) or by a Nack response from all of the cluster interrupt controllers 24A-24n. That is, the interrupt controller may select one of the cluster interrupt controllers 24A-24n, and assert an interrupt request to the selected cluster interrupt controller 24A-24n (e.g., by asserting the soft or hard request, depending on which iteration is being performed). The selected cluster interrupt controller 24A-24n may respond with an Ack response, which may terminate the iteration. On the other hand, if the selected cluster interrupt controller 24A-24n asserts the Nack response, the interrupt controller may be configured to select another cluster interrupt controller 24A-24n and may assert the soft or hard request to the selected cluster interrupt controller 24A-24n. Selection and assertion may continue until either an Ack response is received or each of the cluster interrupt controllers 24A-24n have been selected and asserted the Nack response. Other embodiments may perform an iteration over the cluster interrupt controllers 24A-24n in other fashions. For example, the interrupt controller 20 may be configured to assert an interrupt request to a subset of two or more cluster interrupt controllers 24A-24n concurrently, continuing with other subsets if each cluster interrupt controller 24A-24n in the subset provides a Nack response to the interrupt request. Such an implementation may cause spurious interrupts if more than one cluster interrupt controller 24A-24n in a subset provides an Ack response, and so the code executed in response to the interrupt may be designed to handle the occurrence of a spurious interrupt.

The initial iteration may be the soft iteration, as mentioned above. In the soft iteration, a given cluster interrupt controller 24A-24n may attempt to deliver the interrupt to a subset of the plurality of processors 30 that are associated with the given cluster interrupt controller 24A-24n. The subset may be the processors 30 that are powered on, where the given cluster interrupt controller 24A-24n may not attempt to deliver the interrupt to the processors 30 that are powered off (or sleeping). That is, the powered-off processors are not included in the subset to which the cluster interrupt controller 24A-24n attempts to deliver the interrupt. Thus, the powered-off processors 30 may remain powered off in the soft iteration.

Based on a Nack response from each cluster interrupt controller 24A-24n during the soft iteration, the interrupt controller 20 may perform a hard iteration. In the hard iteration, the powered-off processors 30 in a given processor cluster may be powered on by the respective cluster interrupt controller 24A-24n and the respective interrupt controller 24A-24n may attempt to deliver the interrupt to each processor 30 in the processor cluster. More particularly, if a processor 30 was powered on to perform the hard iteration, that processor 30 may be rapidly available for interrupts and may frequently result in Ack responses, in an embodiment.

If the hard iteration terminates with one or more interrupts still pending, or if a timeout occurs prior to completing the soft and hard iterations, the interrupt controller may initiate a force iteration by asserting the force signal. In an embodiment, the force iteration may be performed in parallel to the cluster interrupt controllers 24A-24n, and Nack responses may not be allowed. The force iteration may remain in progress until no interrupts remain pending, in an embodiment.

A given cluster interrupt controller 24A-24n may attempt to deliver interrupts in any desired fashion. For example, the given cluster interrupt controller 24A-24n may serially assert interrupt requests to respective processors 30 in the processor cluster, terminated by an Ack response from one of the respective processors 30 or by a Nack response from each of the respective processors 30 to which the given cluster interrupt controller 24A-24n is to attempt to deliver the interrupt. That is, the given cluster interrupt controller 24A-4n may select one of respective processors 30, and assert an interrupt request to the selected processor 30 (e.g., by asserting the request to the selected processor 30). The selected processor 30 may respond with an Ack response, which may terminate the attempt. On the other hand, if the selected processor 30 asserts the Nack response, the given cluster interrupt controller 24A-24n may be configured to select another processor 30 and may assert the interrupt request to the selected processor 30. Selection and assertion may continue until either an Ack response is received or each of the processors 30 have been selected and asserted the Nack response (excluding powered-off processors in the soft iteration). Other embodiments may assert the interrupt request to multiple processors 30 concurrently, or to the processors 30 in parallel, with the potential for spurious interrupts as mentioned above. The given cluster interrupt controller 24A-24n may respond to the interrupt controller 20 with an Ack response based on receiving an Ack response from one of the processors 30, or may respond to the interrupt controller 20 with an Nack response if each of the processors 30 responded with a Nack response.

The order in which the interrupt controller 20 asserts interrupt requests to the cluster interrupt controllers 24A-24n may be programmable, in an embodiment. More particularly, in an embodiment, the order may vary based on the source of the interrupt (e.g., interrupts from one interrupt source 32 may result in one order, and interrupts from another interrupt source 32 may result in a different order). For example, in an embodiment, the plurality of processors 30 in one cluster may differ from the plurality of processors 30 in another cluster. One processor cluster may have processors that are optimized for performance but may be higher power, while another processor cluster may have processors optimized for power efficiency. Interrupts from sources that require relatively less processing may favor clusters having the power efficient processors, while interrupts from sources that require significant processing may favor clusters having the higher performance processors.

The interrupt sources 32 may be any hardware circuitry that is configured to assert an interrupt in order to cause a processor 30 to execute an interrupt service routine. For example, various peripheral components (peripherals) may be interrupt sources, in an embodiment. Examples of various peripherals are described below with regard to FIG. 2. The interrupt is asynchronous to the code being executed by the processor 30 when the processor 30 receives the interrupt. Generally, the processor 30 may be configured to take an interrupt by stopping the execution of the current code, saving processor context to permit resumption of execution after servicing the interrupt, and branching to a predetermined address to begin execution of interrupt code. The code at the predetermined address may read state from the interrupt controller to determine which interrupt source 32 asserted the interrupt and a corresponding interrupt service routine that is to be executed based on the interrupt. The code may queue the interrupt service routine for execution (which may be scheduled by the operating system) and provide the data expected by the interrupt service routine. The code may then return execution to the previously executing code (e.g., the processor context may be reloaded and execution may be resumed at the instruction at which execution was halted).

Interrupts may be transmitted in any desired fashion from the interrupt sources 32 to the interrupt controller 20. For example, dedicated interrupt wires may be provided between interrupt sources and the interrupt controller 20. A given interrupt source 32 may assert a signal on its dedicated wire to transmit an interrupt to the interrupt controller 20. Alternatively, message-signaled interrupts may be used in which a message is transmitted over an interconnect that is used for other communications in the system 10. The message may be in the form of a write to a specified address, for example. The write data may be the message identifying the interrupt. A combination of dedicated wires from some interrupt sources 32 and message-signaled interrupts from other interrupt sources 32 may be used.

The interrupt controller 20 may receive the interrupts and record them as pending interrupts in the interrupt controller 20. Interrupts from various interrupt sources 32 may be prioritized by the interrupt controller 20 according to various programmable priorities arranged by the operating system or other control code.

Figure 2:
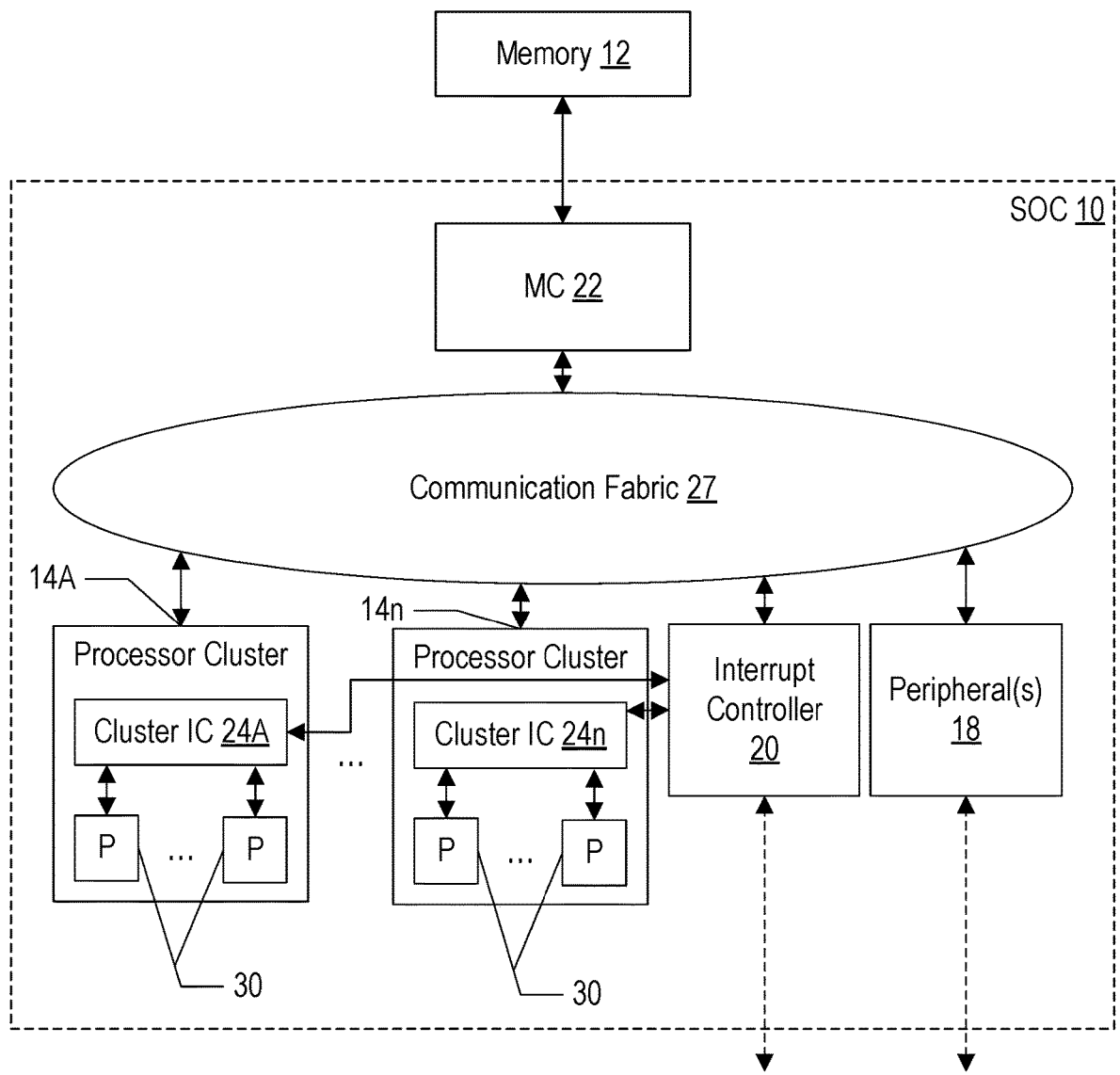
FIG. 2 is a block diagram of one embodiment of a system on a chip (SOC) that may implement one embodiment of the system shown in FIG. 1.

Turning now to FIG. 2, a block diagram one embodiment of the system 10 implemented as a system on a chip (SOC) 10 is shown coupled to a memory 12. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a plurality of processor clusters 14A-14n, the interrupt controller 20, one or more peripheral components 18 (more briefly, "peripherals"), a memory controller 22, and a communication fabric 27. The components 14A-14n, 18, 20, and 22 may all be coupled to the communication fabric 27. The memory controller 22 may be coupled to the memory 12 during use. In some embodiments, there may be more than one memory controller coupled to corresponding memory. The memory address space may be mapped across the memory controllers in any desired fashion. In the illustrated embodiment, the processor clusters 14A-14n may include the respective plurality of processors (P) 30 and the respective cluster interrupt controllers (ICs) 24A-24n as shown in FIG. 2. The processors 30 may form the central processing units (CPU(s)) of the SOC 10. In an embodiment, one or more processor clusters 14A-14n may not be used as CPUs.

The peripherals 18 may include peripherals that are examples of interrupt sources 32, in an embodiment. Thus, one or more peripherals 18 may have dedicated wires to the interrupt controller 20 to transmit interrupts to the interrupt controller 20. Other peripherals 18 may use message-signaled interrupts transmitted over the communication fabric 27. In some embodiments, one or more off-SOC devices (not shown in FIG. 2) may be interrupt sources as well. The dotted line from the interrupt controller 20 to off-chip illustrates the potential for off-SOC interrupt sources.

The hard/soft/force Ack/Nack interfaces between the cluster ICs 24A-24n shown in FIG. 1 are illustrated in FIG. 2 via the arrows between the cluster ICs 24A-24n and the interrupt controller 20. Similarly, the Req Ack/Nack interfaces between the processors 30 and the cluster ICs 24A-24n in FIG. 1 are illustrated by the arrows between the cluster ICs 24A-24n and the processors 30 in the respective clusters 14A-14n.

As mentioned above, the processor clusters 14A-14n may include one or more processors 30 that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc.

Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18 may be any set of additional hardware functionality included in the SOC 10. For example, the peripherals 18 may include video peripherals such as an image signal processor configured to process image capture data from a camera or other image sensor, GPUs, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The interconnection to external device is illustrated by the dashed arrow in FIG. 1 that extends external to the SOC 10. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 2, such as the processors 30 in each processor cluster 14A-14n may vary from embodiment to embodiment. Additionally, the number of processors 30 in one processor cluster 14A-14n may differ from the number of processors 30 in another processor cluster 14A-14n. There may be more or fewer of each component/subcomponent than the number shown in FIG. 2.

Figure 3:
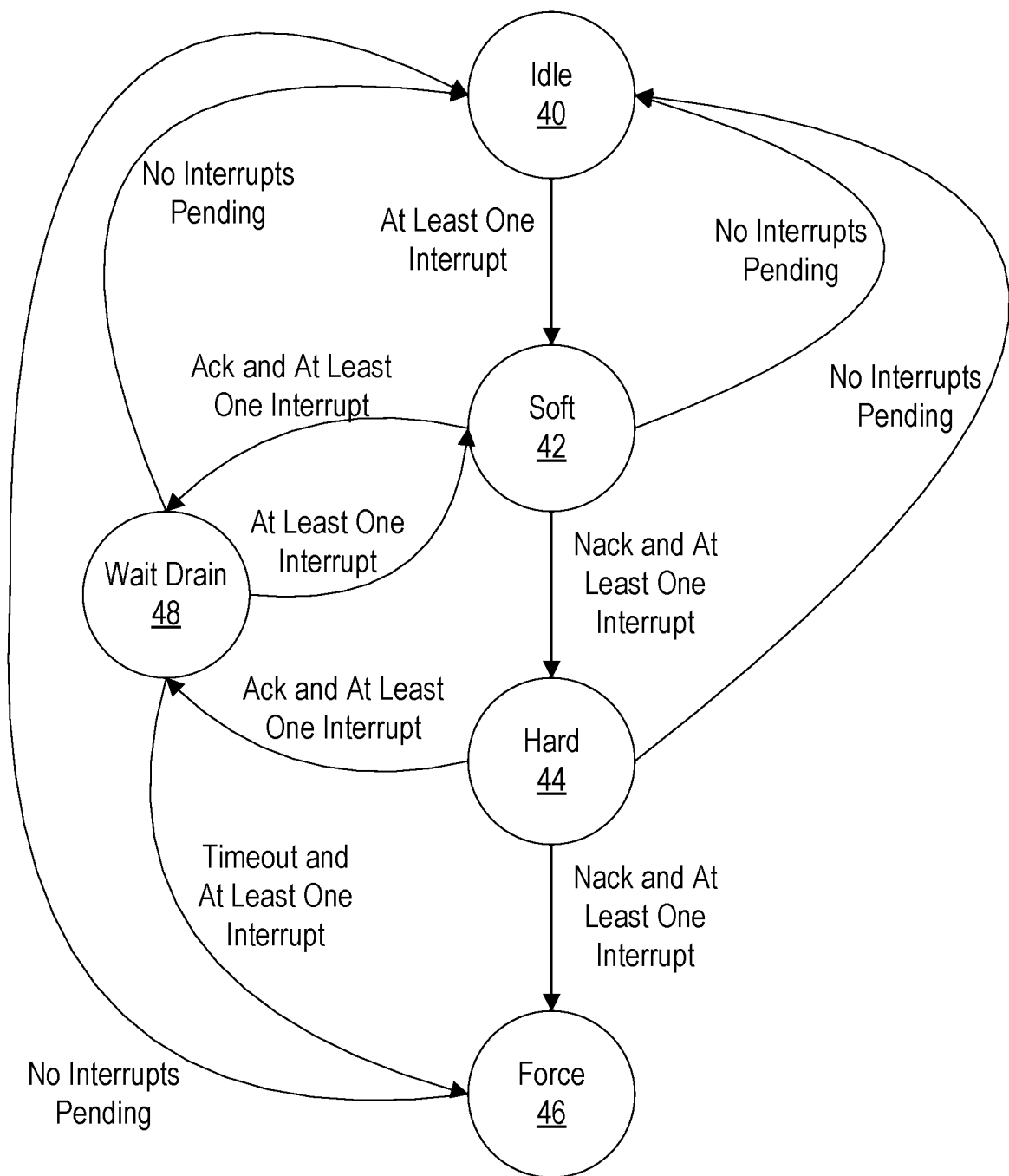
FIG. 3 is a block diagram of one embodiment of a state machine that may be implemented in one embodiment of the interrupt controller.

FIG. 3 is a block diagram illustrating one embodiment of a state machine that may be implemented by the interrupt controller 20 in an embodiment. In the illustrated embodiment, the states include an idle state 40, a soft state 42, a hard state 44, a force state 46, and a wait drain state 48.

In the idle state 40, no interrupts may be pending. Generally, the state machine may return to the idle state 40 whenever no interrupts are pending, from any of the other states as shown in FIG. 3. When at least one interrupt has been received, the interrupt controller 20 may transition to the soft state 42. The interrupt controller 20 may also initialize a timeout counter to begin counting a timeout interval which can cause the state machine to transition to the force state 46. The timeout counter may be initialized to zero and may increment and be compared to a timeout value to detect timeout. Alternatively, the timeout counter may be initialized to the timeout value and may decrement until reaching zero. The increment/decrement may be performed each clock cycle of the clock for the interrupt controller 20, or may increment/decrement according to a different clock (e.g., a fixed frequency clock from a piezo-electric oscillator or the like).

In the soft state 42, the interrupt controller 20 may be configured initiate a soft iteration of attempting to deliver an interrupt. If one of the cluster interrupt controllers 24A-24n transmits the Ack response during the soft iteration and there is at least one interrupt pending, the interrupt controller 20 may transition to the wait drain state 48. The wait drain state 48 may be provided because a given processor may take an interrupt, but may actually capture multiple interrupts from the interrupt controller, queueing them up for their respective interrupt service routines. The processor may continue to drain interrupts until all interrupts have been read from the interrupt controller 20, or may read up to a certain maximum number of interrupts and return to processing, or may read interrupts until a timer expires, in various embodiments. If the timer mentioned above times out and there are still pending interrupts, the interrupt controller 20 may be configured to transition to the force state 46 and initiate a force iteration for delivering interrupts. If the processor stops draining interrupts and there is at least one interrupt pending, or new interrupts are pending, the interrupt controller 20 may be configured to return to the soft state 42 and continue the soft iteration.

If the soft iteration completes with Nack responses from each cluster interrupt controller 24A-24n (and at least one interrupt remains pending), the interrupt controller 20 may be configured to transition to the hard state 44 and may initiate a hard iteration. If a cluster interrupt controller 24A-24n provides the Ack response during the hard iteration and there is at least one pending interrupt, the interrupt controller 20 may transition to the wait drain state 48 similar to the above discussion. If the hard iteration completes with Nack responses from each cluster interrupt controller 24A-24n and there is at least one pending interrupt, the interrupt controller 20 may be configured to transition to the force state 46 and may initiate a force iteration. The interrupt controller 20 may remain in the force state 46 until there are no more pending interrupts.

Figure 4:
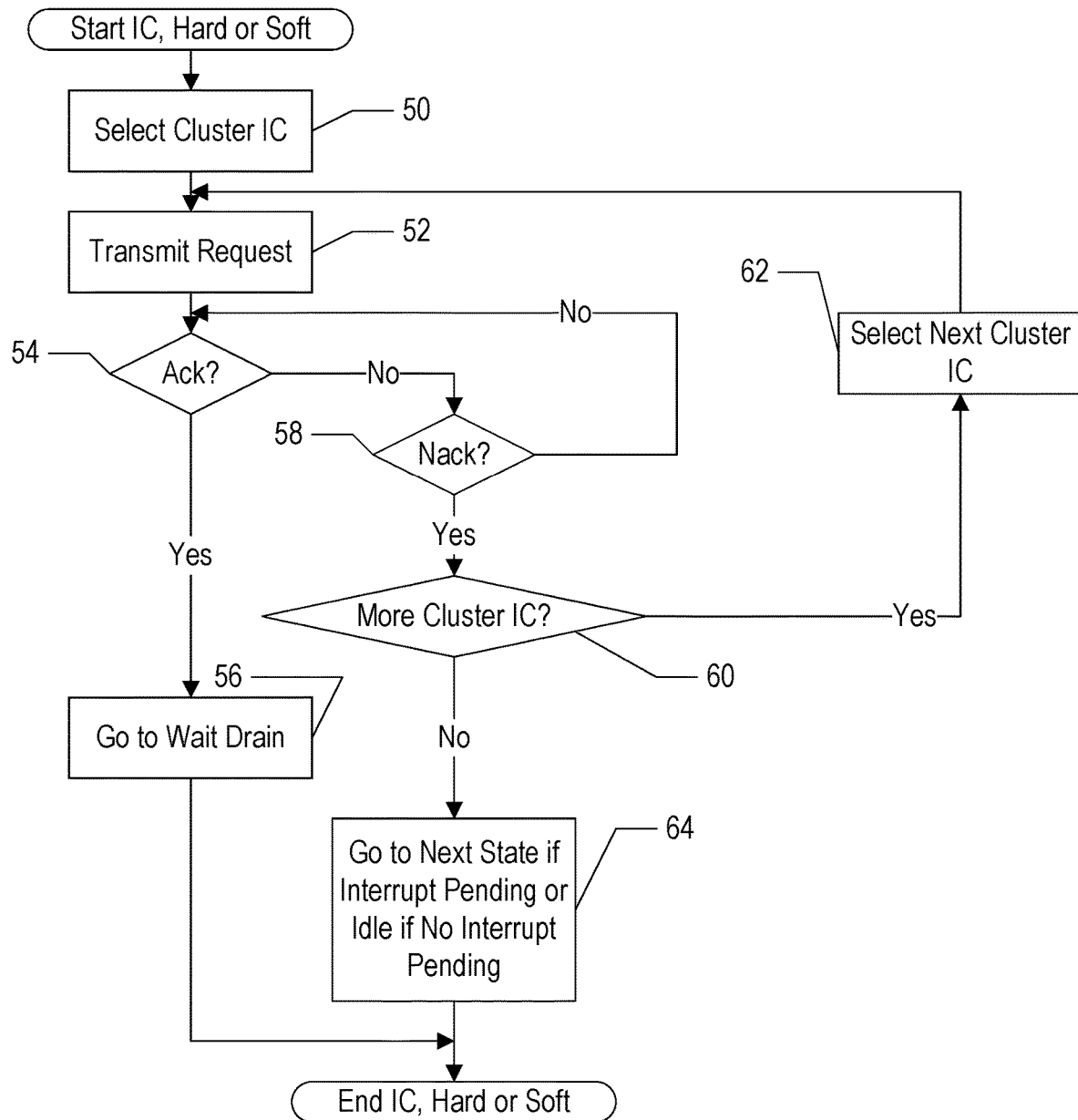
FIG. 4 is a flowchart illustrating operation of one embodiment of the interrupt controller to perform a soft or hard iteration of interrupt delivery.

FIG. 4 is a flowchart illustrating operation of one embodiment of the interrupt controller 20 when performing a soft or hard iteration (e.g., when in the states 42 or 44 in FIG. 3).

While the blocks are shown in a particular order for ease of understanding, other orders may be used. Blocks may be performed in parallel in combinatorial logic circuitry in the interrupt controller 20. Blocks, combinations of blocks, and/or the flowchart as a whole may pipelined over multiple clock cycles. The interrupt controller 20 may be configured to implement the operation illustrated in FIG. 4.

The interrupt controller may be configured to select a cluster interrupt controller 24A-24n (block 50). Any mechanism for selecting the cluster interrupt controller 24A-24n from the plurality of interrupt controllers 24A-24n may be used. For example, a programmable order of the cluster of interrupt controllers 24A-24n may indicate which cluster of interrupt controllers 24A-24n is selected. In an embodiment, the order may be based on the interrupt source of a given interrupt (e.g., there may be multiple orders available a particular order may be selected based on the interrupt source). Such an implementation may allow different interrupt sources to favor processors of a given type (e.g., performance-optimized or efficiency-optimized) by initially attempting to deliver the interrupt to processor clusters of the desired type before moving on to processor clusters of a different type. In another embodiment, a least recently delivered algorithm may be used to select the most recent cluster interrupt controller 24A-24n (e.g., the cluster interrupt controller 24A-24n that least recently generated an Ack response for an interrupt) to spread the interrupts across different processor clusters. In another embodiment, a most recently delivered algorithm may be used to select a cluster interrupt controller (e.g., the cluster interrupt controller 24A-24n that most recently generated an Ack response for an interrupt) to take advantage of the possibility that interrupt code or state is still cached in the processor cluster. Any mechanism or combination of mechanisms may be used.

The interrupt controller 20 may be configured to transmit the interrupt request (hard or soft, depending on the current iteration) to the selected cluster interrupt controller 24A-24n (block 52). For example, the interrupt controller 20 may assert a hard or soft interrupt request signal to the selected cluster interrupt controller 24A-24n. If the selected cluster interrupt controller 24A-24n provides an Ack response to the interrupt request (decision block 54, "yes" leg), the interrupt controller 20 may be configured to transition to the wait drain state 48 to allow the processor 30 in the processor cluster 14A-14n associated with the selected cluster interrupt controller 24A-24n to service one or more pending interrupts (block 56). If the selected cluster interrupt controller provides a Nack response (decision block 58, "yes" leg) and there is at least one cluster interrupt controller 24A-24n that has not been selected in the current iteration (decision block 60, "yes" leg), the interrupt controller 20 may be configured to select the next cluster interrupt controller 24A-24n according to the implemented selection mechanism (block 62), and return to block 52 to assert the interrupt request to the selected cluster interrupt controller 24A-24n. Thus, the interrupt controller 20 may be configured to serially attempt to deliver the interrupt controller to the plurality of cluster interrupt controllers 24A-24n during an iteration over the plurality of cluster interrupt controllers 24A-24n in this embodiment. If the selected cluster interrupt controller 24A-24n provides the Nack response (decision block 58, "yes" leg) and there are no more cluster interrupt controllers 24A-24n remaining to be selected (e.g. all cluster interrupt controllers 24A-24n have been selected), the cluster interrupt controller 20 may be configured to transition to the next state in the state machine (e.g. to the hard state 44 if the current iteration is the soft iteration or to the force state 46 if the current iteration is the hard iteration) (block 64). If a response has not yet been received for the interrupt request (decision blocks 54 and 58, "no" legs), the interrupt controller 20 may be configured to continue waiting for the response.

As mentioned above, there may be a timeout mechanism that may be initialized when the interrupt delivery process begins. If the timeout occurs during any state, in an embodiment, the interrupt controller 20 may be configured to move to the force state 46. Alternatively, timer expiration may only be considered in the wait drain state 48.

Figure 5:
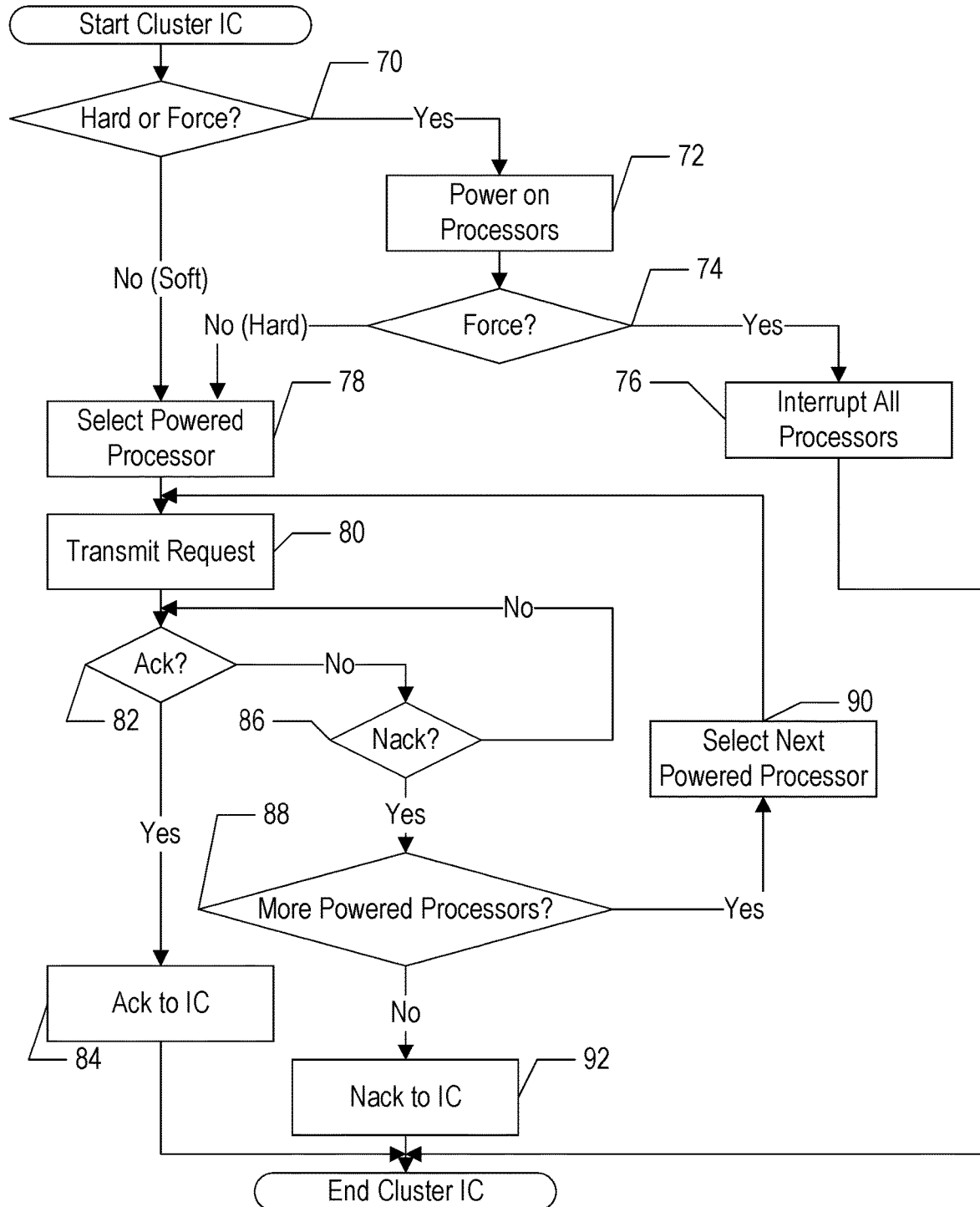
FIG. 5 is a flowchart illustrating operation of one embodiment of a cluster interrupt controller.

FIG. 5 is a flowchart illustrating operation of one embodiment of a cluster interrupt controller 24A-24n based on an interrupt request from the interrupt controller 20. While the blocks are shown in a particular order for ease of understanding, other orders may be used. Blocks may be performed in parallel in combinatorial logic circuitry in the cluster interrupt controller 24A-24n. Blocks, combinations of blocks, and/or the flowchart as a whole may pipelined over multiple clock cycles. The cluster interrupt controller 24A-24n may be configured to implement the operation illustrated in FIG. 5.

If the interrupt request is a hard or force request (decision block 70, "yes" leg), the cluster interrupt controller 24A-24n may be configured to power up any powered-down (e.g., sleeping) processors 30 (block 72). If the interrupt request is a force interrupt request (decision block 74, "yes" leg), the cluster interrupt controller 24A-24n may be configured to interrupt all processors 30 in parallel (block 76). Ack/Nack may not apply in the force case, so the cluster interrupt controller 24A-24n may continue asserting the interrupt requests until at least one processor takes the interrupt. Alternatively, the cluster interrupt controller 24A-24n may be configured to receive an Ack response from a processor indicating that it will take the interrupt, and may terminate the force interrupt and transmit an Ack response to the interrupt controller 20.

If the interrupt request is a hard request (decision block 74, "no" leg) or is a soft request (decision block 70, "no" leg), the cluster interrupt controller may be configured to select a powered-on processor 30 (block 78). Any selection mechanism may be used, similar to the mechanisms mentioned above for selecting cluster interrupt controllers 24A-24n by the interrupt controller 20 (e.g., programmable order, least recently interrupted, most recently interrupted, etc.). In an embodiment, the order may be based on the processor IDs assigned to the processors in the cluster. The cluster interrupt controller 24A-24n may be configured to assert the interrupt request to the selected processor 30, transmitting the request to the processor 30 (block 80). If the selected processor 30 provides the Ack response (decision block 82, "yes" leg), the cluster interrupt controller 24A-24n may be configured to provide the Ack response to the interrupt controller 20 (block 84) and terminate the attempt to deliver the interrupt within the processor cluster. If the selected processor 30 provides the Nack response (decision block 86, "yes" leg) and there is at least one powered-on processor 30 that has not been selected yet (decision block 88, "yes" leg), the cluster interrupt controller 24A-24n may be configured to select the next powered-on processor (e.g., according to the selection mechanism described above) (block 90) and assert the interrupt request to the selected processor 30 (block 80). Thus, the cluster interrupt controller 24A-24n may serially attempt to deliver the interrupt to the processors 30 in the processor cluster. If there are no more powered-on processors to select (decision block 88, "no" leg), the cluster interrupt controller 24A-24n may be configured to provide the Nack response to the interrupt controller 20 (block 92). If the selected processor 30 has not yet provided a response (decision blocks 82 and 86, "no" legs), the cluster interrupt controller 24A-24n may be configured to wait for the response.

In an embodiment, in a hard iteration, if a processor 30 has been powered-on from the powered-off state then it may be quickly available for an interrupt since it has not yet been assigned a task by the operating system or other controlling software. The operating system may be configured to unmask interrupts in processor 30 that has been powered-on from a powered-off state as soon as practical after initializing the processor. The cluster interrupt controller 24A-24n may select a recently powered-on processor first in the selection order to improve the likelihood that the processor will provide an Ack response for the interrupt.

Figure 6:
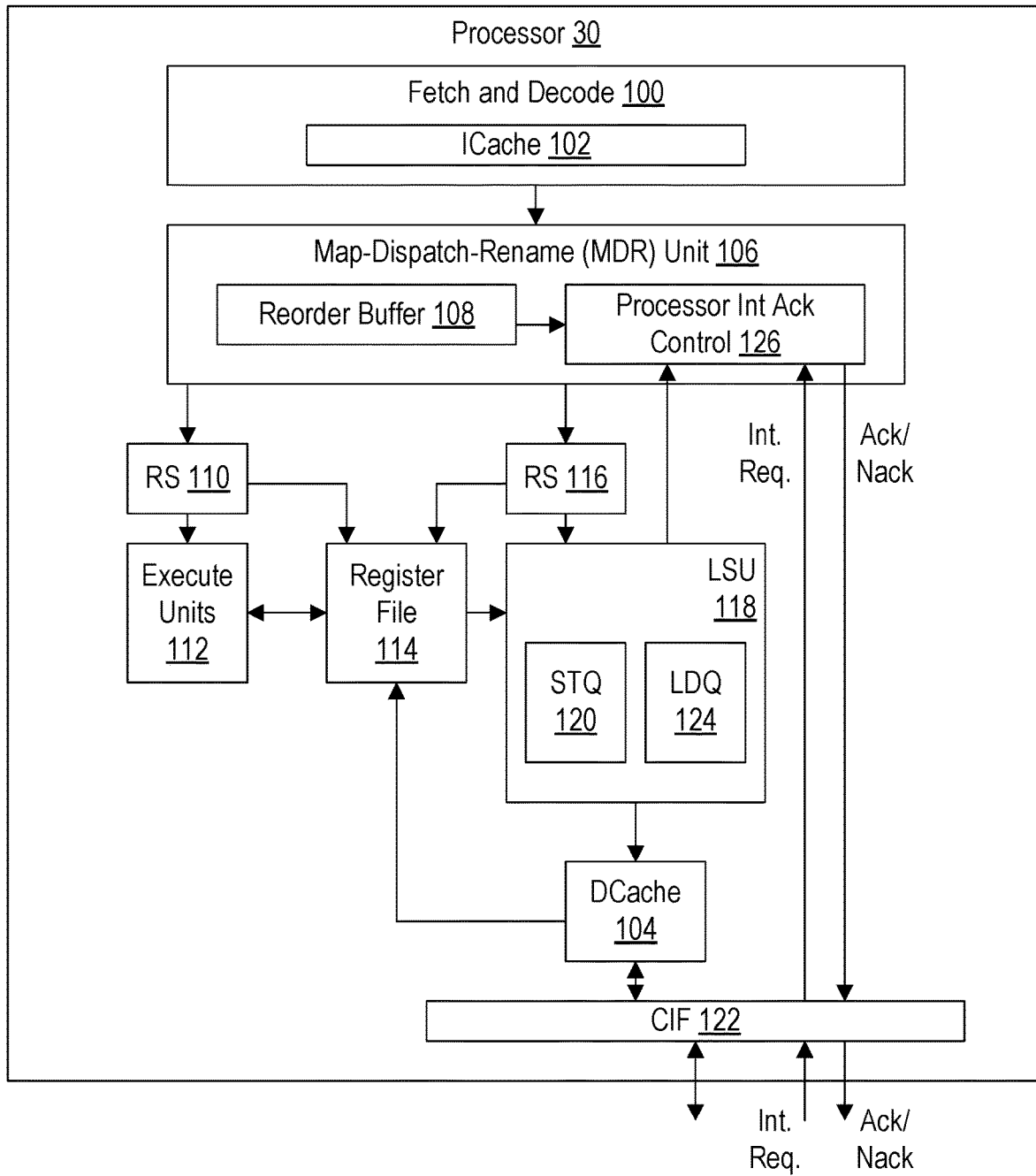
FIG. 6 is a block diagram of one embodiment of a processor.

FIG. 6 is a block diagram of one embodiment of a processor 30 in more detail. In the illustrated embodiment, the processor 30 includes a fetch and decode unit 100 (including an instruction cache, or ICache, 102), a map-dispatch-rename (MDR) unit 106 (including a processor interrupt acknowledgement (Int Ack) control circuit 126 and a reorder buffer 108), one or more reservation stations 110, one or more execute units 112, a register file 114, a data cache (DCache) 104, a load/store unit (LSU) 118, a reservation station (RS) for the load/store unit 116, and a core interface unit (CIF) 122. The fetch and decode unit 100 is coupled to the MDR unit 106, which is coupled to the reservation stations 110, the reservation station 116, and the LSU 118. The reservation stations 110 are coupled to the execution units 28. The register file 114 is coupled to the execute units 112 and the LSU 118. The LSU 118 is also coupled to the DCache 104, which is coupled to the CIF 122 and the register file 114. The LSU 118 includes a store queue 120 (STQ 120) and a load queue (LDQ 124). The CIF 122 is coupled to the processor Int Ack control circuit 126 to convey and interrupt request (Int Req) asserted to the processor 30 and to convey an Ack/Nack response from the processor Int Ack control circuit 126 to the interrupt requester (e.g., a cluster interrupt controller 24A-24n).

The processor Int Ack control circuit 126 may be configured to determine whether or not the processor 30 may accept an interrupt request transmitted to the processor 30, and may provide Ack and Nack indications to the CIF 122 based on the determination. If the processor 30 provides the Ack response, the processor 30 is committing to taking the interrupt (and starting execution of the interrupt code to identify the interrupt and the interrupt source) within a specified period of time. That is, the processor Int Ack control circuit 126 may be configured to generate an acknowledge (Ack) response to the interrupt request received based on a determination that the reorder buffer 108 will retire instruction operations to an interruptible point and the LSU 118 will complete load/store operations to the interruptible point within the specified period of time. If the determination is that at least one of the reorder buffer 108 and the LSU 118 will not reach (or might not reach) the interruptible point within the specified period of time, the processor Int Ack control circuit 126 may be configured to generate a non-acknowledge (Nack) response to the interrupt request. For example, the specified period of time may be on the order of 5 microseconds in one embodiment, but may be longer or shorter in other embodiments.

In an embodiment, the processor Int Ack control circuit 126 may be configured to examine the contents of the reorder buffer 108 to make an initial determination of Ack/Nack. That is, there may be one or more cases in which the processor Int Ack control circuit 126 may be able to determine that the Nack response will be generated based on state within the MDR unit 106. For example, the reorder buffer 108 includes one or more instruction operations that have not yet executed and that have a potential execution latency greater than a certain threshold, the processor Int Ack control circuit 126 may be configured to determine that the Nack response is to be generated. The execution latency is referred to as "potential" because some instruction operations may have a variable execution latency that may be data dependent, memory latency dependent, etc. Thus, the potential execution latency may be the longest execution latency that may occur, even if it does not always occur. In other cases, the potential execution latency may be the longest execution latency that occurs above a certain probability, etc. Examples of such instructions may include certain cryptographic acceleration instructions, certain types of floating point or vector instructions, etc. The instructions may be considered potentially long latency if the instructions are not interruptible. That is, the uninterruptible instructions are required to complete execution once they begin execution.

Another condition that may be considered in generating the Ack/Nack response is the state of interrupt masking in the processor 30. When interrupts are masked, the processor 30 is prevented from taking interrupts. The Nack response may be generated if the processor Int Ack control circuit 126 detects that interrupts are masked in the processor (which may be state maintained in the MDR unit 106 in one embodiment). More particularly, in an embodiment, the interrupt mask may have an architected current state corresponding to the most recently retired instructions and one or more speculative updates to the interrupt mask may be queued as well. In an embodiment, the Nack response may be generated if the architected current state is that interrupts are masked. In another embodiment, the Nack response may be generated if the architected current state is that interrupts are masked, or if any of the speculative states indicate that interrupts are masked.

Other cases may be considered Nack response cases as well in the processor Int Ack control circuit 126. For example, if there is a pending redirect in the reorder buffer that is related to exception handling (e.g., no microarchitectural redirects like branch mispredictions or the like), a Nack response may be generated. Certain debug modes (e.g., single step mode) and high priority internal interrupts may be considered Nack response cases.

If the processor Int Ack control circuit 126 does not detect a Nack response based on examining the reorder buffer 108 and the processor state in the MDR unit 106, the processor Int Ack control circuit 126 may interface with the LSU 118 to determine if there are long-latency load/store ops that have been issued (e.g., to the CIF 122 or external to the processor 30) and that have not completed yet coupled to the reorder buffer and the load/store unit. For example, loads and stores to device space (e.g., loads and stores that are mapped to peripherals instead of memory) may be potentially long-latency. If the LSU 118 responds that there are long-latency load/store ops (e.g., potentially greater than a threshold, which may be different from or the same as the above-mentioned threshold used internal to the MDR unit 106), then the processor Int Ack control circuit 126 may determine that the response is to be Nack. Other potentially-long latency ops may be synchronization barrier operations, for example.

In one embodiment, if the determination is not the Nack response for the above cases, the LSU 118 may provide a pointer to the reorder buffer 108, identifying an oldest load/store op that the LSU 118 is committed to completing (e.g., it has been launched from the LDQ 124 or the STQ 120, or is otherwise non-speculative in the LSU 118). The pointer may be referred to as the "true load/store (LS) non-speculative (NS) pointer." The MDR 106/reorder buffer 108 may attempt to interrupt at the LS NS pointer, and if it is not possible within the specified time period, the processor Int Ack control circuit 126 may determine that the Nack response is to be generated. Otherwise, the Ack response may be generated.

The fetch and decode unit 100 may be configured to fetch instructions for execution by the processor 30 and decode the instructions into ops for execution. More particularly, the fetch and decode unit 100 may be configured to cache instructions previously fetched from memory (through the CIF 122) in the ICache 102, and may be configured to fetch a speculative path of instructions for the processor 30. The fetch and decode unit 100 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. The fetch and decode unit 100 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 30 may be decoded into a single instruction operation, and thus the instruction operation may be essentially synonymous with instruction (although it may be modified in form by the decoder). The term "instruction operation" may be more briefly referred to herein as "op."

The MDR unit 106 may be configured to map the ops to speculative resources (e.g., physical registers) to permit out-of-order and/or speculative execution, and may dispatch the ops to the reservation stations 110 and 116. The ops may be mapped to physical registers in the register file 114 from the architectural registers used in the corresponding instructions. That is, the register file 114 may implement a set of physical registers that may be greater in number than the architected registers specified by the instruction set architecture implemented by the processor 30. The MDR unit 106 may manage the mapping of the architected registers to physical registers. There may be separate physical registers for different operand types (e.g., integer, media, floating point, etc.) in an embodiment. In other embodiments, the physical registers may be shared over operand types. The MDR unit 106 may also be responsible for tracking the speculative execution and retiring ops or flushing misspeculated ops. The reorder buffer 108 may be used to track the program order of ops and manage retirement/flush. That is, the reorder buffer 108 may be configured to track a plurality of instruction operations corresponding to instructions fetched by the processor and not retired by the processor.

Ops may be scheduled for execution when the source operands for the ops are ready. In the illustrated embodiment, decentralized scheduling is used for each of the execution units 28 and the LSU 118, e.g., in reservation stations 116 and 110. Other embodiments may implement a centralized scheduler if desired.

The LSU 118 may be configured to execute load/store memory ops.

Generally, a memory operation (memory op) may be an instruction operation that specifies an access to memory (although the memory access may be completed in a cache such as the DCache 104). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data. In some embodiments, it may be possible for the store data op to be executed before the corresponding store address op, e.g., if the store data operand is provided before one or more of the store address operands. While store ops may be executed as store address and store data ops in some embodiments, other embodiments may not implement the store address/store data split. The remainder of this disclosure will often use store address ops (and store data ops) as an example, but implementations that do not use the store address/store data optimization are also contemplated. The address generated via execution of the store address op may be referred to as an address corresponding to the store op.

Load/store ops may be received in the reservation station 116, which may be configured to monitor the source operands of the operations to determine when they are available and then issue the operations to the load or store pipelines, respectively. Some source operands may be available when the operations are received in the reservation station 116, which may be indicated in the data received by the reservation station 116 from the MDR unit 106 for the corresponding operation. Other operands may become available via execution of operations by other execution units 112 or even via execution of earlier load ops. The operands may be gathered by the reservation station 116, or may be read from a register file 114 upon issue from the reservation station 116 as shown in FIG. 6.

In an embodiment, the reservation station 116 may be configured to issue load/store ops out of order (from their original order in the code sequence being executed by the processor 30, referred to as "program order") as the operands become available. To ensure that there is space in the LDQ 124 or the STQ 120 for older operations that are bypassed by younger operations in the reservation station 116, the MDR unit 106 may include circuitry that preallocates LDQ 124 or STQ 120 entries to operations transmitted to the load/store unit 118. If there is not an available LDQ entry for a load being processed in the MDR unit 106, the MDR unit 106 may stall dispatch of the load op and subsequent ops in program order until one or more LDQ entries become available. Similarly, if there is not a STQ entry available for a store, the MDR unit 106 may stall op dispatch until one or more STQ entries become available. In other embodiments, the reservation station 116 may issue operations in program order and LRQ 46/STQ 120 assignment may occur at issue from the reservation station 116.

The LDQ 124 may track loads from initial execution to retirement by the LSU 118. The LDQ 124 may be responsible for ensuring the memory ordering rules are not violated (between out of order executed loads, as well as between loads and stores). If a memory ordering violation is detected, the LDQ 124 may signal a redirect for the corresponding load. A redirect may cause the processor 30 to flush the load and subsequent ops in program order, and refetch the corresponding instructions. Speculative state for the load and subsequent ops may be discarded and the ops may be refetched by the fetch and decode unit 100 and reprocessed to be executed again.

When a load/store address op is issued by the reservation station 116, the LSU 118 may be configured to generate the address accessed by the load/store, and may be configured to translate the address from an effective or virtual address created from the address operands of the load/store address op to a physical address actually used to address memory. The LSU 118 may be configured to generate an access to the DCache 104. For load operations that hit in the DCache 104, data may be speculatively forwarded from the DCache 104 to the destination operand of the load operation (e.g., a register in the register file 114), unless the address hits a preceding operation in the STQ 120 (that is, an older store in program order) or the load is replayed. The data may also be forwarded to dependent ops that were speculatively scheduled and are in the execution units 28. The execution units 28 may bypass the forwarded data in place of the data output from the register file 114, in such cases. If the store data is available for forwarding on a STQ hit, data output by the STQ 120 may forwarded instead of cache data. Cache misses and STQ hits where the data cannot be forwarded may be reasons for replay and the load data may not be forwarded in those cases. The cache hit/miss status from the DCache 104 may be logged in the STQ 120 or LDQ 124 for later processing.

The LSU 118 may implement multiple load pipelines. For example, in an embodiment, three load pipelines ("pipes") may be implemented, although more or fewer pipelines may be implemented in other embodiments. Each pipeline may execute a different load, independent and in parallel with other loads. That is, the RS 116 may issue any number of loads up to the number of load pipes in the same clock cycle. The LSU 118 may also implement one or more store pipes, and in particular may implement multiple store pipes. The number of store pipes need not equal the number of load pipes, however. In an embodiment, for example, two store pipes may be used. The reservation station 116 may issue store address ops and store data ops independently and in parallel to the store pipes. The store pipes may be coupled to the STQ 120, which may be configured to hold store operations that have been executed but have not committed.

The CIF 122 may be responsible for communicating with the rest of a system including the processor 30, on behalf of the processor 30. For example, the CIF 122 may be configured to request data for DCache 104 misses and ICache 102 misses. When the data is returned, the CIF 122 may signal the cache fill to the corresponding cache. For DCache fills, the CIF 122 may also inform the LSU 118. The LDQ 124 may attempt to schedule replayed loads that are waiting on the cache fill so that the replayed loads may forward the fill data as it is provided to the DCache 104 (referred to as a fill forward operation). If the replayed load is not successfully replayed during the fill, the replayed load may subsequently be scheduled and replayed through the DCache 104 as a cache hit. The CIF 122 may also writeback modified cache lines that have been evicted by the DCache 104, merge store data for non-cacheable stores, etc.

The execution units 112 may include any types of execution units in various embodiments. For example, the execution units 112 may include integer, floating point, and/or vector execution units. Integer execution units may be configured to execute integer ops. Generally, an integer op is an op which performs a defined operation (e.g., arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g., base 2, in an embodiment).

Vector execution units may be configured to execute vector ops. Vector ops may be used, e.g., to process media data (e.g., image data such as pixels, audio data, etc.). Media processing may be characterized by performing the same processing on significant amounts of data, where each datum is a relatively small value (e.g., 8 bits, or 16 bits, compared to 32 bits to 64 bits for an integer). Thus, vector ops include single instruction-multiple data (SIMD) or vector operations on an operand that represents multiple media data.

Thus, each execution unit 112 may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of depend ops occurs based on a load op may vary based on the type of op and execution unit 28 that will be executing the op.

It is noted that any number and type of execution units 112 may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g., 32 bytes, 64 bytes, 128 bytes, or larger or smaller cache lines). Different caches may have different cache line sizes. The ICache 102 and DCache 104 may each be a cache having any desired capacity, cache line size, and configuration. There may be more additional levels of cache between the DCache 104/ICache 102 and the main memory, in various embodiments.

At various points, load/store operations are referred to as being younger or older than other load/store operations. A first operation may be younger than a second operation if the first operation is subsequent to the second operation in program order. Similarly, a first operation may be older than a second operation if the first operation precedes the second operation in program order.

Figure 7:
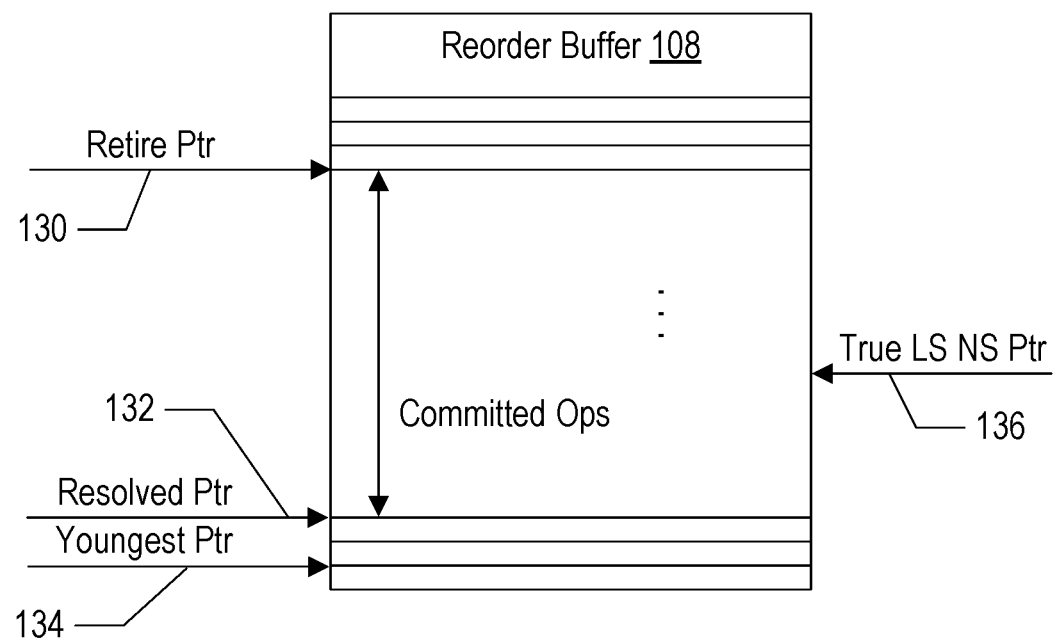
FIG. 7 is a block diagram of one embodiment of a reorder buffer.

FIG. 7 is a block diagram of one embodiment of the reorder buffer 108. In the illustrated embodiment, the reorder buffer 108 includes a plurality of entries. Each entry may correspond to an instruction, an instruction operation, or a group of instruction operations, in various embodiments. Various state related to the instruction operations may be stored in the reorder buffer (e.g., target logical and physical registers to update the architected register map, exceptions or redirects detected during execution, etc.).

Several pointers are illustrated in FIG. 7. The retire pointer 130 may point to the oldest non-retired op in the processor 30. That is, ops prior to the op at the retire pointer 130 have been retired from the reorder buffer 108, the architected state of the processor 30 has been updated to reflect execution of the retired ops, etc. The resolved pointer 132 may point to the oldest op for which preceding branch instructions have been resolved as correctly predicted and for which preceding ops that might cause an exception have been resolved to not cause an exception. The ops between the retire pointer 130 and the resolve pointer 132 may be committed ops in the reorder buffer 108. That is, the execution of the instructions that generated the ops will complete to the resolved pointer 132 (in the absence of external interrupts). The youngest pointer 134 may point to the mostly recently fetched and dispatched op from the MDR unit 106. Ops between the resolved pointer 132 and the youngest pointer 134 are speculative and may be flushed due to exceptions, branch mispredictions, etc.

The true LS NS pointer 136 is the true LS NS pointer described above. The true LS NS pointer may only be generated when an interrupt request has been asserted and the other tests for Nack response have been negative (e.g., an Ack response is indicated by those tests). The MDR unit 106 may attempt to move the resolved pointer 132 back to the true LS NS pointer 136. There may be committed ops in the reorder buffer 108 that cannot be flushed (e.g., once they are committed, they must be completed and retired). Some groups of instruction operations may not be interruptible (e.g., microcode routines, certain uninterruptible exceptions, etc.). In such cases, the processor Int Ack controller 126 may be configured to generate the Nack response. There may be ops, or combinations of ops, that are too complex to "undo" in the processor 30, and the existence of such ops in between the resolve pointer and the true LS NS pointer 136 may cause the processor Int Ack controller 126 to generate the Nack response. If the reorder buffer 108 is successful in moving the resolve pointer back to the true LS NS pointer 136, the processor Int Ack control circuit 126 may be configured to generate the Ack response.

Figure 8:
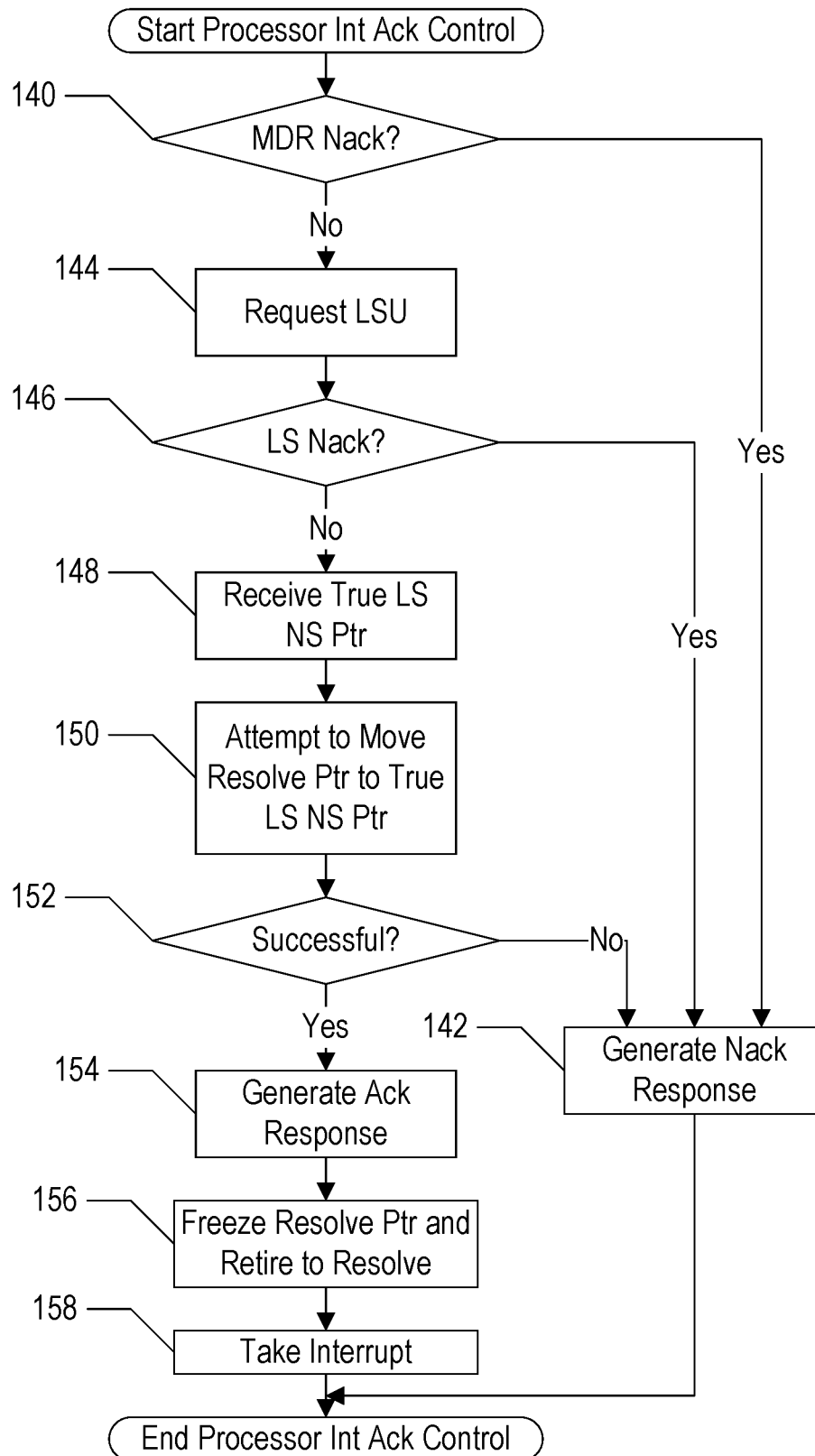
FIG. 8 is a flowchart illustrating operation of one embodiment of an interrupt acknowledgement control circuit shown in FIG. 6.

FIG. 8 is a flowchart illustrating operation of one embodiment of the processor Int Ack control circuit 126 based on receipt of an interrupt request by the processor 30. While the blocks are shown in a particular order for ease of understanding, other orders may be used. Blocks may be performed in parallel in combinatorial logic circuitry in the processor Int Ack control circuit 126. Blocks, combinations of blocks, and/or the flowchart as a whole may pipelined over multiple clock cycles. The processor Int Ack control circuit 126 may be configured to implement the operation illustrated in FIG. 8.

The processor Int Ack control circuit 126 may be configured to determine if there are any Nack conditions detected in the MDR unit 106 (decision block 140). For example, potentially long-latency operations that have not completed, interrupts are masked, etc. may be Nack conditions detected in the MDR unit 106. If so (decision block 140, "yes" leg), the processor Int Ack control circuit 126 may be configured to generate the Nack response (block 142). If not (decision block 140, "no" leg), the processor Int Ack control circuit 126 may communicate with the LSU to request Nack conditions and/or the true LS NS pointer (block 144). If the LSU 118 detects a Nack condition (decision block 146, "yes" leg), the processor Int Ack control circuit 126 may be configured to generate the Nack response (block 142). If the LSU 118 does not detect a Nack condition (decision block 146, "no" leg), the processor Int Ack control circuit 126 may be configured to receive the true LS NS pointer from the LSU 118 (block 148) and may attempt to move the resolve pointer in the reorder buffer 108 back to the true LS NS pointer (block 150). If the move is not successful (e.g., there is at least one instruction operation between the true LS NS pointer and the resolve pointer that cannot be flushed) (decision block 152, "no" leg), the processor Int Ack control circuit 126 may be configured to generate the Nack response (block 142). Otherwise (decision block 152, "yes" leg), the processor Int Ack control circuit 126 may be configured to generate the Ack response (block 154). The processor Int Ack control circuit 126 may be configured to freeze the resolve pointer at the true LS NS pointer, and retire ops until the retire pointer reaches the resolve pointer (block 156). The processor Int Ack control circuit 126 may then be configured to take the interrupt (block 158). That is, the processor 30 may begin fetching the interrupt code (e.g., from a predetermined address associate with interrupts according to instruction set architecture implemented by the processor 30).

In another embodiment, the SOC 10 may be one of the SOCs in a system. More particularly, in one embodiment, multiple instances of the SOC 10 may be employed. Other embodiments may have asymmetrical SOCs. Each SOC may be a separate integrated circuit chip (e.g., implemented on a separate semiconductor substrate or "die"). The die may be packaged and connected to each other via an interposer, package on package solution, or the like. Alternatively, the die may be packaged in a chip-on-chip package solution, a multichip module, etc.

Figure 9:
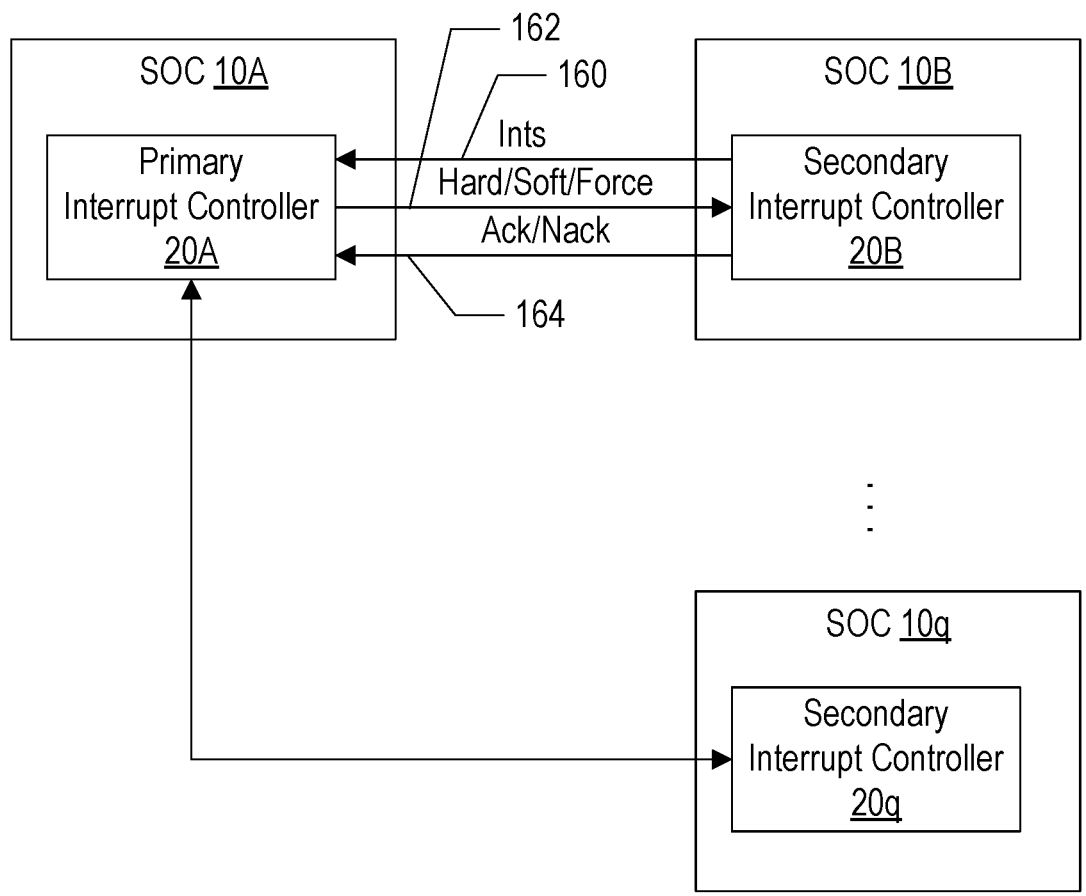
FIG. 9 is a block diagram of a plurality of SOCs that may implement one embodiment of the system shown in FIG. 1.

FIG. 9 is a block diagram illustrating one embodiment of a system including multiple instances of the SOC 10. For example, the SOC 10A, the SOC 10B, etc. to the SOC 10$q$ may be coupled together in a system. Each SOC 10A-10$q$ includes an instance of the interrupt controller 20 (e.g., interrupt controller 20A, interrupt controller 20B, and interrupt controller 20$q$ in FIG. 9). One interrupt controller, interrupt controller 20A in this example, may serve as the primary interrupt controller for the system. Other interrupt controllers 20B to 20$q$ may serve as secondary interrupt controllers.

The interface between the primary interrupt controller 20A and the secondary controller 20B is shown in more detail in FIG. 9, and the interface between the primary interrupt controller 20A and other secondary interrupt controllers, such as the interrupt controller 20$q$, may be similar. In the embodiment of FIG. 9, the secondary controller 20B is configured to provide interrupt information identifying interrupts issued from interrupt sources on the SOC 10B (or external devices coupled to the SOC 10B, not shown in FIG. 9) as Ints 160. The primary interrupt controller 20A is configured to signal hard, soft, and force iterations to the secondary interrupt controller 20B (reference numeral 162) and is configured to receive Ack/Nack responses from the interrupt controller 20B (reference numeral 164). The interface may be implemented in any fashion. For example, dedicated wires may be coupled between the SOC 10A and the SOC 10B to implement reference numerals 160, 162, and/or 164. In another embodiment, messages may be exchanged between the primary interrupt controller 20A and the secondary interrupt controllers 20B-20$q$ over a general interface between the SOCs 10A-10$q$ that is also used for other communications. In an embodiment, programmed input/output (PIO) writes may be used with the interrupt data, hard/soft/force requests, and Ack/Nack responses as data, respectively.

The primary interrupt controller 20A may be configured to collect the interrupts from various interrupt sources, which may be on the SOC 10A, one of the other SOCs 10B-10$q$, which may be off-chip devices, or any combination thereof. The secondary interrupt controllers 20B-20$q$ may be configured to transmit interrupts to the primary interrupt controller 20A (Ints in FIG. 9), identifying the interrupt source to the primary interrupt controller 20A. The primary interrupt controller 20A may also be responsible for ensuring the delivery of interrupts. The secondary interrupt controllers 20B-20$q$ may be configured to take direction from the primary interrupt controller 20A, receiving soft, hard, and force iteration requests from the primary interrupt controller 20A and performing the iterations over the cluster interrupt controllers 24A-24$n$ embodied on the corresponding SOC 10B-10$q$. Based on the Ack/Nack responses from the cluster interrupt controllers 24A-24$n$, the secondary interrupt controllers 20B-20$q$ may provide Ack/Nack responses. In an embodiment, the primary interrupt controller 20A may serially attempt to deliver interrupts over the secondary interrupt controllers 20B-20$q$ in the soft and hard iterations, and may deliver in parallel to the secondary interrupt controllers 20B-20$q$ in the force iteration.

In an embodiment, the primary interrupt controller 20A may be configured to perform a given iteration on a subset of the cluster interrupt controllers that are integrated into the same SOC 10A as the primary interrupt controller 20A prior to performing the given iteration on subsets of the cluster interrupt controllers on other SOCs 10B-10$q$ (with the assistance of the secondary interrupt controllers 20B-20$q$) on other SOCs 10B-10$q$. That is the primary interrupt controller 20A may serially attempt to deliver the interrupt through the cluster interrupt controllers on the SOC 10A, and then may communicate to the secondary interrupt controllers 20B-20$q$. The attempts to deliver through the secondary interrupt controllers 20B-20$q$ may be performed serially as well. The order of attempts through the secondary interrupt controllers 20B-20$q$ may be determined in any desire fashion, similar to the embodiments described above for cluster interrupt controllers and processors in a cluster (e.g., programmable order, most recently accepted, least recently accepted, etc.). Accordingly, the primary interrupt controller 20A and secondary interrupt controllers 20B-20$q$ may largely insulate the software from the existence of the multiple SOCs 10A-10$q$. That is, the SOCs 10A-10$q$ may be configured as a single system that is largely transparent to software execution on the single system. During system initialization, some embodiments may be programmed to configure the interrupt controllers 20A-20$q$ as discussed above, but otherwise the interrupt controllers 20A-20$q$ may manage the delivery of interrupts across possibly multiple SOCs 10A-10$q$, each on a separate semiconductor die, without software assistance or particular visibility of software to the multiple-die nature of the system. For example, delays due to inter-die communication may be minimized in the system. Thus, during execution after initialization, the single system may appear to software as a single system and the multi-die nature of the system may be transparent to software.

It is noted that the primary interrupt controller 20A and the secondary interrupt controllers 20B-20$q$ may operate in a manner that is also referred to as "master" (i.e., primary) and "slave" (i.e., secondary) by those of skill in the art. While the primary/secondary terminology is used herein, it is expressly intended that the terms "primary" and "secondary" be interpreted to encompass these counterpart terms.

In an embodiment, each instance of the SOC 10A-10$q$ may have both the primary interrupt controller circuitry and the secondary interrupt controller circuitry implemented in its interrupt controller 20A-20$q$. One interrupt controller (e.g., interrupt controller 20A) may be designated the primary during manufacture of the system (e.g., via fuses on the SOCs 10A-10$q$, or pin straps on one or more pins of the SOCs 10A-10$q$). Alternatively, the primary and secondary designations may be made during initialization (or boot) configuration of the system.

Figure 10:
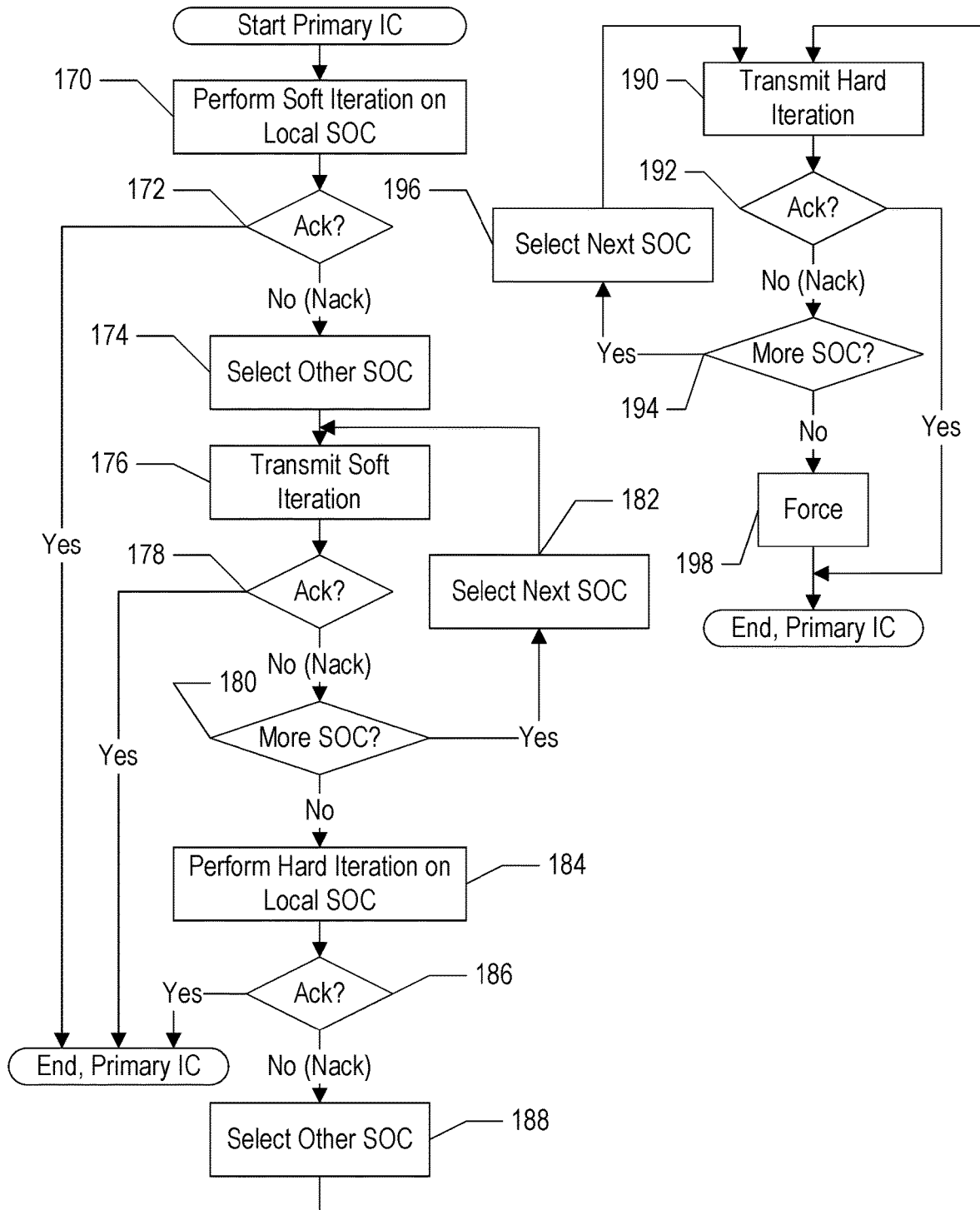
FIG. 10 is a flowchart illustrating operation of one embodiment of a primary interrupt controller shown in FIG. 9.

FIG. 10 is a flowchart illustrating operation of one embodiment of the primary interrupt controller 20A based on receipt of one or more interrupts from one or more interrupt sources. While the blocks are shown in a particular order for ease of understanding, other orders may be used. Blocks may be performed in parallel in combinatorial logic circuitry in the primary interrupt controller 20A. Blocks, combinations of blocks, and/or the flowchart as a whole may pipelined over multiple clock cycles. The primary interrupt controller 20A may be configured to implement the operation illustrated in FIG. 10.

The primary interrupt controller 20A may be configured to perform a soft iteration over the cluster interrupt controllers integrated on to the local SOC 10A (block 170). For example, the soft iteration may be similar to the flowchart of FIG. 4. If the local soft iteration results in an Ack response (decision block 172, "yes" leg), the interrupt may be successfully delivered and the primary interrupt controller 20A may be configured to return to the idle state 40 (assuming there are no more pending interrupts). If the local soft iteration results in a Nack response (decision block 172, "no" leg), the primary interrupt controller 20A may be configured to select one of the other SOCs 10B-10$q$ using any desired order as mentioned above (block 174). The primary interrupt controller 20A may be configured to assert a soft iteration request to the secondary interrupt controller 20B-20$q$ on the selected SOC 10B-10$q$ (block 176). If the secondary interrupt controller 20B-20$q$ provides an Ack response (decision block 178, "yes" leg), the interrupt may be successfully delivered and the primary interrupt controller 20A may be configured to return to the idle state 40 (assuming there are no more pending interrupts). If the secondary interrupt controller 20B-20$q$ provides a Nack response (decision block 178, "no" leg) and there are more SOCs 10B-10$q$ that have not yet been selected in the soft iteration (decision block 180, "yes" leg), the primary interrupt controller 20A may be configured to select the next SOC 10B-10$q$ according to the implemented ordering mechanism (block 182) and may be configured to transmit the soft iteration request to the secondary interrupt controller 20B-20$q$ on the selected SOC (block 176) and continue processing. On the other hand, if each SOC 10B-10$q$ has been selected, the soft iteration may be complete since the serial attempt to deliver the interrupt over the secondary interrupt controllers 20B-20$q$ is complete.

Based on completing the soft iteration over the secondary interrupt controllers 20B-20$q$ without successfully interrupt deliver (decision block 180, "no" leg), the primary interrupt controller 20A may be configured to perform a hard iteration over the local cluster interrupt controllers integrated on to the local SOC 10A (block 184). For example, the soft iteration may be similar to the flowchart of FIG. 4. If the local hard iteration results in an Ack response (decision block 186, "yes" leg), the interrupt may be successfully delivered and the primary interrupt controller 20A may be configured to return to the idle state 40 (assuming there are no more pending interrupts). If the local hard iteration results in a Nack response (decision block 186, "no" leg), the primary interrupt controller 20A may be configured to select one of the other SOCs 10B-10$q$ using any desired order as mentioned above (block 188). The primary interrupt controller 20A may be configured to assert a hard iteration request to the secondary interrupt controller 20B-20$q$ on the selected SOC 10B-10$q$ (block 190). If the secondary interrupt controller 20B-20$q$ provides an Ack response (decision block 192, "yes" leg), the interrupt may be successfully delivered and the primary interrupt controller 20A may be configured to return to the idle state 40 (assuming there are no more pending interrupts). If the secondary interrupt controller 20B-20$q$ provides a Nack response (decision block 192, "no" leg) and there are more SOCs 10B-10$q$ that have not yet been selected in the hard iteration (decision block 194, "yes" leg), the primary interrupt controller 20A may be configured to select the next SOC 10B-10$q$ according to the implemented ordering mechanism (block 196) and may be configured to transmit the hard iteration request to the secondary interrupt controller 20B-20$q$ on the selected SOC (block 190) and continue processing. On the other hand, if each SOC 10B-10$q$ has been selected, the hard iteration may be complete since the serial attempt to deliver the interrupt over the secondary interrupt controllers 20B-20$q$ is complete (decision block 194, "no" leg). The primary interrupt controller 20A may be configured proceed with a force iteration (block 198). The force iteration may be performed locally, or may be performed in parallel or serially over the local SOC 10A and the other SOCs 10B-10$q$.

As mentioned above, there may be a timeout mechanism that may be initialized when the interrupt delivery process begins. If the timeout occurs during any state, in an embodiment, the interrupt controller 20 may be configured to move to the force iteration. Alternatively, timer expiration may only be considered in the wait drain state 48, again as mentioned above.

Figure 11:
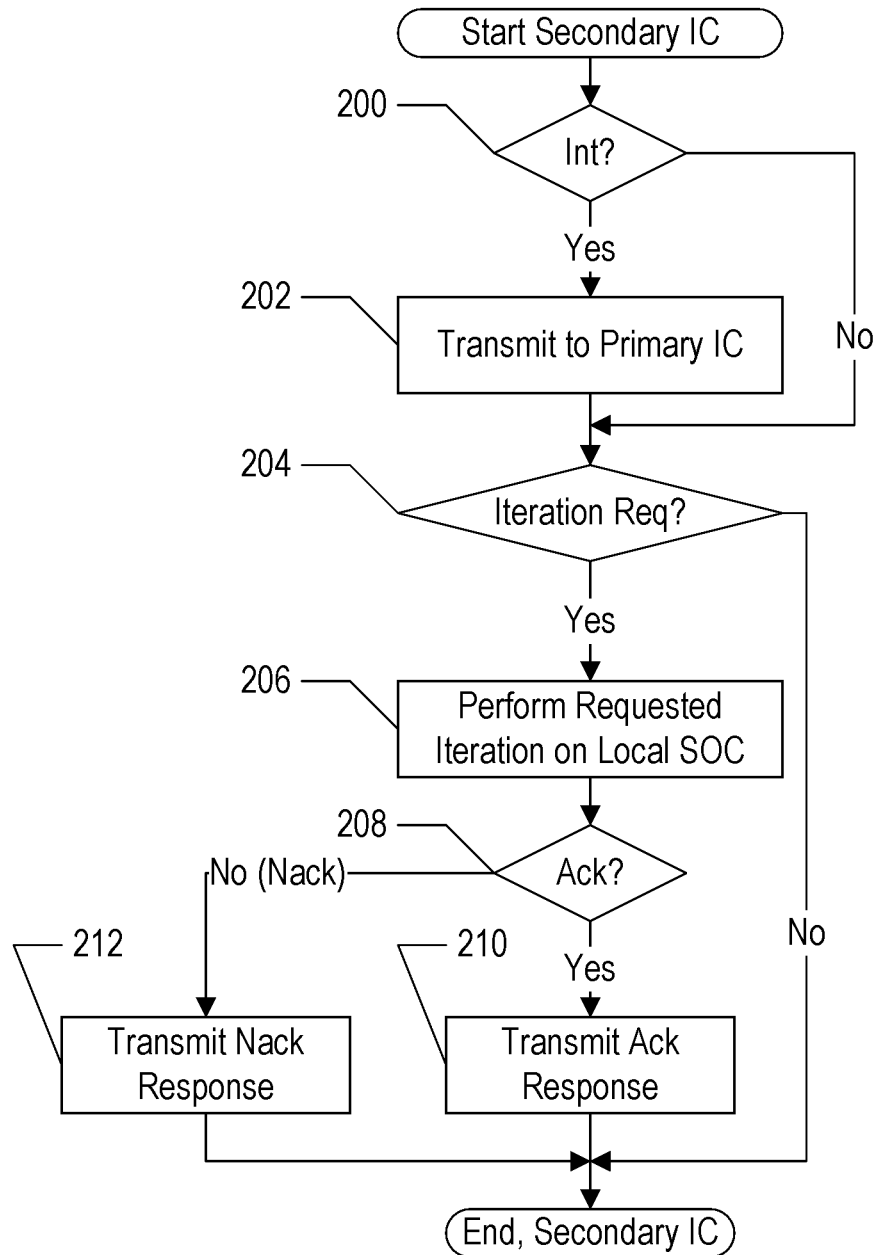
FIG. 11 is a flowchart illustrating operation of one embodiment of a secondary interrupt controller shown in FIG. 9.

FIG. 11 is a flowchart illustrating operation of one embodiment of the secondary interrupt controller 20B-20$q$. While the blocks are shown in a particular order for ease of understanding, other orders may be used. Blocks may be performed in parallel in combinatorial logic circuitry in the secondary interrupt controller 20B-20$q$. Blocks, combinations of blocks, and/or the flowchart as a whole may pipelined over multiple clock cycles. The secondary interrupt controller 20B-20$q$ may be configured to implement the operation illustrated in FIG. 11.

If an interrupt source in the corresponding SOC 10B-10$q$ (or coupled to the SOC 10B-10$q$) provides an interrupt to the secondary interrupt controller 20B-20$q$ (decision block 200, "yes" leg), the secondary interrupt controller 20B-20$q$ may be configured to transmit the interrupt to the primary interrupt controller 20A for handling along with other interrupts from other interrupt sources (block 202).

If the primary interrupt controller 20A has transmitted an iteration request (decision block 204, "yes" leg), the secondary interrupt controller 20B-20$q$ may be configured to perform the requested iteration (hard, soft, or force) over the cluster interrupt controllers in the local SOC 10B-10$q$ (block 206). For example, hard and soft iterations may be similar to FIG. 4, and force may be performed in parallel to the cluster interrupt controllers in the local SOC 10B-10$q$. If the iteration results in an Ack response (decision block 208, "yes" leg), the secondary interrupt controller 20B-20$q$ may be configured to transmit an Ack response to the primary interrupt controller 20A (block 210). If the iteration results in a Nack response (decision block 208, "no" leg), the secondary interrupt controller 20B-20$q$ may be configured to transmit a Nack response to the primary interrupt controller 20A (block 212).

Figure 12:
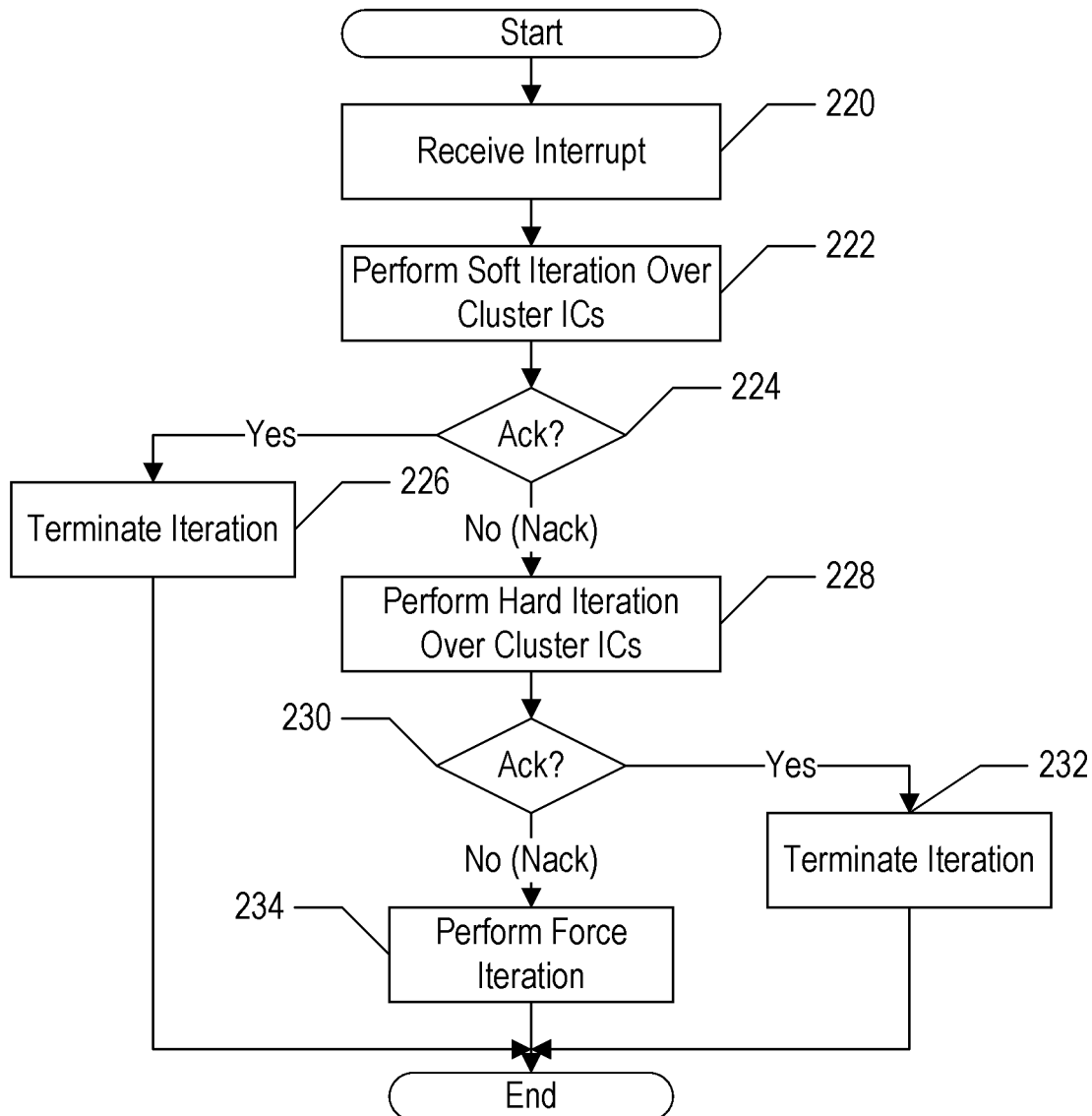
FIG. 12 is a flowchart illustrating one embodiment of a method for handling interrupts.

FIG. 12 is a flowchart illustrating one embodiment of a method for handling interrupts. While the blocks are shown in a particular order for ease of understanding, other orders may be used. Blocks may be performed in parallel in combinatorial logic circuitry in the systems describe herein. Blocks, combinations of blocks, and/or the flowchart as a whole may pipelined over multiple clock cycles. The systems described herein may be configured to implement the operation illustrated in FIG. 12.

An interrupt controller 20 may receive an interrupt from an interrupt source (block 220). In embodiments having primary and secondary interrupt controllers 20A-20$q$, the interrupt may be received in any interrupt controller 20A-20$q$ and provided to the primary interrupt controller 20A as part of receiving the interrupt from the interrupt source. The interrupt controller 20 may be configured to perform a first iteration (e.g., a soft iteration) of serially attempting to deliver the interrupt to a plurality of cluster interrupt controllers (block 222). A respective cluster interrupt controller of the plurality of cluster interrupt controllers is associated with a respective processor cluster comprising a plurality of processors. A given cluster interrupt controller of the plurality of cluster interrupt controllers, in the first iteration, may be configured to attempt to deliver the interrupt to a subset of the respective plurality of processors that are powered on without attempting to deliver the interrupt to ones of the respective plurality of processors that are not included in the subset. If an Ack response is received, the iteration may be terminated by the interrupt controller 20 (decision block 224, "yes" leg and block 226). On the other hand (decision block 224, "no" leg), based on non-acknowledge (Nack) responses from the plurality of cluster interrupt controllers in the first iteration, the interrupt controller may be configured to perform a second iteration over the plurality of cluster interrupt controllers (e.g., a hard iteration) (block 228). The given cluster interrupt controller, in the second iteration, may be configured to power on the ones of the respective plurality of processors that are powered off and attempt to deliver the interrupt to the respective plurality of processors. If an Ack response is received, the iteration may be terminated by the interrupt controller 20 (decision block 230, "yes" leg and block 232). On the other hand (decision block 230, "no" leg), based on non-acknowledge (Nack) responses from the plurality of cluster interrupt controllers in the second iteration, the interrupt controller may be configured to perform a third iteration over the plurality of cluster interrupt controllers (e.g., a force iteration) (block 234).

Computer System

Figure 13:
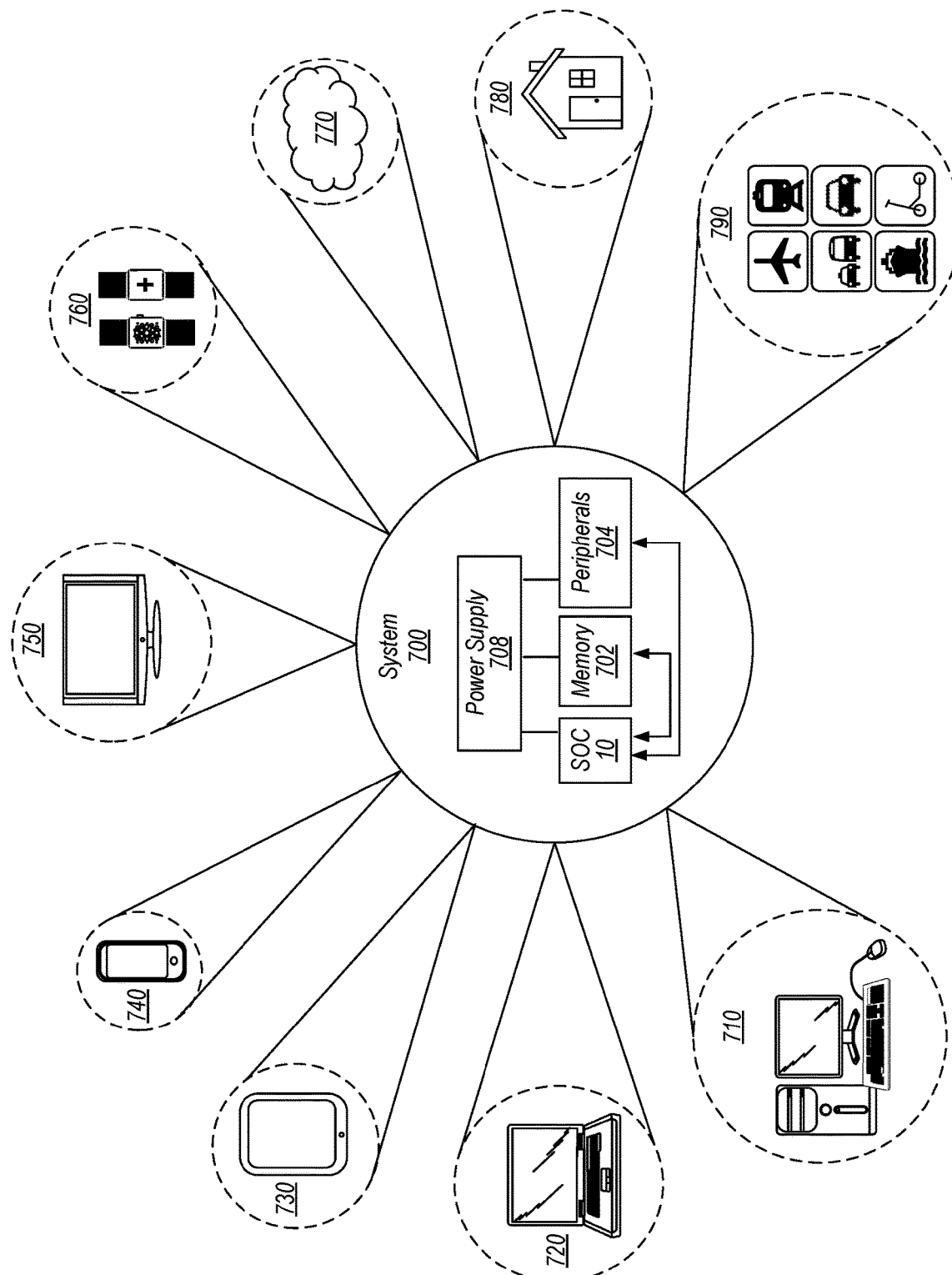
FIG. 13 is a block diagram of one embodiment of a system used in a variety of contexts.

Turning next to FIG. 13, a block diagram of one embodiment of a system 700 is shown. In the illustrated embodiment, the system 700 includes at least one instance of a system on a chip (SOC) 10 coupled to one or more peripherals 704 and an external memory 702. A power supply (PMU) 708 is provided which supplies the supply voltages to the SOC 10 as well as one or more supply voltages to the memory 702 and/or the peripherals 154. In some embodiments, more than one instance of the SOC 10 (e.g., the SOCs 10A-10q) may be included (and more than one memory 702 may be included as well). The memory 702 may include the memory 12 illustrated in FIG. 2, in an embodiment.

The peripherals 704 may include any desired circuitry, depending on the type of system 700. For example, in one embodiment, the system 700 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 10 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 13 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 13 are illustrative only and are not intended to be limiting. Other devices are possible and are contemplated.

Computer Readable Storage Medium

Turning now to FIG. 14, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 14 may store a database 804 representative of the SOC 10. Generally, the database 804 may be a database which can be read by a program and used, directly or indirectly, to fabricate the hardware comprising the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database

804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 10, as desired, including any subset of the components shown in FIG. 2. The database 804 may represent any portion of the above.

Based on this disclosure, a system may comprise a plurality of cluster interrupt controllers and an interrupt controller coupled to the plurality of cluster interrupt controllers. A respective cluster interrupt controller of the plurality of cluster interrupt controllers may be associated with a respective processor cluster comprising a plurality of processors. The interrupt controller may be configured to receive an interrupt from a first interrupt source and may be configured, based on the interrupt, to: perform a first iteration over the plurality of cluster interrupt controllers to attempt to deliver the interrupt; and based on non-acknowledge (Nack) responses from the plurality of cluster interrupt controllers in the first iteration, perform a second iteration over the plurality of cluster interrupt controllers. A given cluster interrupt controller of the plurality of cluster interrupt controllers, in the first iteration, may be configured to attempt to deliver the interrupt to a subset of the plurality of processors in the respective processor cluster that are powered on without attempting to deliver the interrupt to ones of the respective plurality of processors in the respective cluster that are not included in the subset. In the second iteration, the given cluster interrupt controller may be configured to power on the ones of the respective plurality of processors that are powered off and attempt to deliver the interrupt to the respective plurality of processors. In an embodiment, during the attempt to deliver the interrupt over the plurality of cluster interrupt controllers: the interrupt controller may be configured to assert a first interrupt request to a first cluster interrupt controller of the plurality of cluster interrupt controllers; and based on the Nack response from the first cluster interrupt controller, the interrupt controller may be configured to assert a second interrupt request to a second cluster interrupt controller of the plurality of cluster interrupt controllers. In an embodiment, during the attempt to deliver the interrupt over the plurality of cluster interrupt controllers, based on a second Nack response from the second cluster interrupt controller, the interrupt controller may be configured to assert a third interrupt request to a third cluster interrupt controller of the plurality of cluster interrupt controllers. In an embodiment, during the attempt to deliver the interrupt over the plurality of cluster interrupt controllers and based on an acknowledge (Ack) response from the second cluster interrupt controller and a lack of additional pending interrupts, the interrupt controller may be configured to terminate the attempt. In an embodiment, during the attempt to deliver the interrupt over the plurality of cluster interrupt controllers: the interrupt controller may be configured to assert an interrupt request to a first cluster interrupt controller of the plurality of cluster interrupt controllers; and based on an acknowledge (Ack) response from the first cluster interrupt controller and a lack of additional pending interrupts, the interrupt controller may be configured to terminate the attempt. In an embodiment, during the attempt to deliver the interrupt over the plurality of cluster interrupt controllers, the interrupt controller may be configured to serially assert interrupt requests to one or more cluster interrupt controllers of the plurality of cluster interrupt controllers, terminated by an acknowledge (Ack) response from a first cluster interrupt controller of the one or more cluster interrupt controllers. In an embodiment, the interrupt controller may be configured to serially assert in a programmable order. In an embodiment, the interrupt controller may be configured to serially assert the interrupt request based on the first interrupt source. A second interrupt from a second interrupt source may result in a different order of the serial assertion. In an embodiment, during the attempt to deliver the interrupt over the plurality of cluster interrupt controllers: the interrupt controller may be configured to assert an interrupt request to a first cluster interrupt controller of the plurality of cluster interrupt controllers; and the first cluster interrupt controller may be configured to serially assert processor interrupt requests to the plurality of processors in the respective processor cluster based on the interrupt request to the first cluster interrupt controller. In an embodiment, the first cluster interrupt controller is configured to terminate serial assertion based on an acknowledge (Ack) response from a first processor of the plurality of processors. In an embodiment, the first cluster interrupt controller may be configured to transmit the Ack response to the interrupt controller based on the Ack response from the first processor. In an embodiment, the first cluster interrupt controller may be configured to provide the Nack response to the interrupt controller based on Nack responses from the plurality of processors in the respective cluster during the serial assertion of processor interrupts. In an embodiment, the interrupt controller may be included on a first integrated circuit on a first semiconductor substrate that includes a first subset of the plurality of cluster interrupt controllers. A second subset of the plurality of cluster interrupt controllers may be implemented on a second integrated circuit on second, separate semiconductor substrate. The interrupt controller may be configured to serially assert interrupt requests to the first subset prior to attempting to deliver to the second subset. In an embodiment, the second integrated circuit includes a second interrupt controller, and the interrupt controller may be configured to communicate the interrupt request to the second interrupt controller responsive to the first subset refusing the interrupt. The second interrupt controller may be configured to attempt to deliver the interrupt to the second subset.

In an embodiment, a processor comprises a reorder buffer, a load/store unit, and a control circuit coupled to the reorder buffer and the load/store unit. The reorder buffer may be configured to track a plurality of instruction operations corresponding to instructions fetched by the processor and not retired by the processor. The load/store unit may be configured to execute load/store operations. The control circuit may be configured to generate an acknowledge (Ack) response to an interrupt request received by the processor based on a determination that the reorder buffer will retire instruction operations to an interruptible point and the load/store unit will complete load/store operations to the interruptible point within a specified period of time. The control circuit may be configured to generate a non-acknowledge (Nack) response to the interrupt request based on a determination that at least one of the reorder buffer and the load/store unit will not reach the interruptible point within the specified period of time. In an embodiment, the determination may be the Nack response based on the reorder buffer having at least one instruction operation that has a potential execution latency greater than a threshold. In an embodiment, the determination may be the Nack response based on the reorder buffer having at least one instruction operation that causes interrupts to be masked. In an embodiment, the determination is the Nack response based on the load/store unit having at least one load/store operation to a device address space outstanding.

In an embodiment, a method comprises receiving an interrupt from a first interrupt source in an interrupt controller. The method may further comprise performing a first iteration of serially attempting to deliver the interrupt to a plurality of cluster interrupt controllers. A respective cluster interrupt controller of the plurality of cluster interrupt controllers associated with a respective processor cluster comprising a plurality of processors, in the first iteration, may be configured to attempt to deliver the interrupt to a subset of the plurality of processors in the respective processor cluster that are powered on without attempting to deliver the interrupt to ones of the plurality of processors in the respective processor cluster that are not included in the subset. The method may further comprise, based on non-acknowledge (Nack) responses from the plurality of cluster interrupt controllers in the first iteration, performing a second iteration over the plurality of cluster interrupt controllers by the interrupt controller. In the second iteration, the given cluster interrupt controller may be configured to power on the ones of the plurality of processors that are powered off in the respective processor cluster and attempt to deliver the interrupt to the plurality of processors. In an embodiment, serially attempting to deliver the interrupt to the plurality of cluster interrupt controllers is terminated based on an acknowledge response from one of the plurality of cluster interrupt controllers.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A system comprising:
    a plurality of cluster interrupt controllers, wherein a respective cluster interrupt controller of the plurality of cluster interrupt controllers is associated with a respective processor cluster of a plurality of processor clusters, and wherein a given processor cluster of the plurality of processor clusters comprises a plurality of processors; and
    an interrupt controller coupled to the plurality of cluster interrupt controllers, wherein the interrupt controller is configured to receive an interrupt from a first interrupt source and is configured, based on the interrupt, to:
        perform a first iteration over the plurality of cluster interrupt controllers to attempt to deliver the interrupt;
        based on non-acknowledge (Nack) responses from the plurality of cluster interrupt controllers in the first iteration, perform a second iteration over the plurality of cluster interrupt controllers;
    wherein a given cluster interrupt controller of the plurality of cluster interrupt controllers, in the first iteration, is configured to attempt to deliver the interrupt to a subset of the plurality of processors in the respective processor cluster that are powered on without attempting to deliver the interrupt to ones of the respective plurality of processors in the respective processor cluster that are not included in the subset; and
    wherein the given cluster interrupt controller, in the second iteration, is configured to power on the ones of the plurality of processors that are powered off and attempt to deliver the interrupt to the plurality of processors.

2. The system as recited in claim 1 wherein, during the attempt to deliver the interrupt over the plurality of cluster interrupt controllers:
    the interrupt controller is configured to assert a first interrupt request to a first cluster interrupt controller of the plurality of cluster interrupt controllers; and
    based on the Nack response from the first cluster interrupt controller, the interrupt controller is configured to assert a second interrupt request to a second cluster interrupt controller of the plurality of cluster interrupt controllers.

3. The system as recited in claim 2 wherein, during the attempt to deliver the interrupt over the plurality of cluster interrupt controllers:
    based on a second Nack response from the second cluster interrupt controller, the interrupt controller is configured to assert a third interrupt request to a third cluster interrupt controller of the plurality of cluster interrupt controllers.

4. The system as recited in claim 2 wherein, during the attempt to deliver the interrupt over the plurality of cluster interrupt controllers:
    based on an acknowledge (Ack) response from the second cluster interrupt controller and a lack of additional pending interrupts, the interrupt controller is configured to terminate the attempt.

5. The system as recited in claim 1 wherein, during the attempt to deliver the interrupt over the plurality of cluster interrupt controllers:
    the interrupt controller is configured to assert an interrupt request to a first cluster interrupt controller of the plurality of cluster interrupt controllers; and
    based on an acknowledge (Ack) response from the first cluster interrupt controller and a lack of additional pending interrupts, the interrupt controller is configured to terminate the attempt.

6. The system as recited in claim 1 wherein, during the attempt to deliver the interrupt over the plurality of cluster interrupt controllers:

the interrupt controller is configured to serially assert interrupt requests to one or more cluster interrupt controllers of the plurality of cluster interrupt controllers, terminated by an acknowledge (Ack) response from a first cluster interrupt controller of the one or more cluster interrupt controllers.

7. The system as recited in claim 6 wherein the interrupt controller is configured to serially assert in a programmable order.

8. The system as recited in claim 6 wherein the interrupt controller is configured to serially assert the interrupt request based on the first interrupt source, wherein a second interrupt from a second interrupt source results in a different order of the serial assertion.

9. The system as recited in claim 1 wherein, during the attempt to deliver the interrupt over the plurality of cluster interrupt controllers:
the interrupt controller is configured to assert an interrupt request to a first cluster interrupt controller of the plurality of cluster interrupt controllers; and
the first cluster interrupt controller is configured to serially assert processor interrupt requests to the plurality of processors in the respective processor cluster based on the interrupt request to the first cluster interrupt controller.

10. The system as recited in claim 9 wherein the first cluster interrupt controller is configured to terminate serial assertion based on an acknowledge (Ack) response from a first processor of the plurality of processors.

11. The system as recited in claim 10 wherein the first cluster interrupt controller is configured to transmit the Ack response to the interrupt controller based on the Ack response from the first processor.

12. The system as recited in claim 9 wherein the first cluster interrupt controller is configured to provide the Nack response to the interrupt controller based on Nack responses from the plurality of processors in the respective cluster during the serial assertion of processor interrupts.

13. The system as recited in claim 1 wherein the interrupt controller is included on a first integrated circuit on a first semiconductor substrate that includes a first subset of the plurality of cluster interrupt controllers, and wherein a second subset of the plurality of cluster interrupt controllers are implemented on a second integrated circuit on second, separate semiconductor substrate, and wherein the interrupt controller is configured to serially assert interrupt requests to the first subset prior to attempting to deliver to the second subset.

14. The system as recited in claim 13 wherein the second integrated circuit includes a second interrupt controller, and wherein the interrupt controller is configured to communicate the interrupt request to the second interrupt controller responsive to the first subset refusing the interrupt, and wherein the second interrupt controller is configured to attempt to deliver the interrupt to the second subset.

15. A processor comprising:
a reorder buffer configured to track a plurality of instruction operations corresponding to instructions fetched by the processor and not retired by the processor;
a load/store unit configured to execute load/store operations; and
a control circuit coupled to the reorder buffer and the load/store unit, wherein the control circuit is configured to generate an acknowledge (Ack) response to an interrupt request received by the processor based on a determination that the reorder buffer will retire instruction operations to an interruptible point and the load/store unit will complete load/store operations to the interruptible point within a specified period of time, and wherein the control circuit is configured to generate a non-acknowledge (Nack) response to the interrupt request based on a determination that at least one of the reorder buffer and the load/store unit will not reach the interruptible point within the specified period of time.

16. The processor as recited in claim 15 wherein the determination is the Nack response based on the reorder buffer having at least one instruction operation that has a potential execution latency greater than a threshold.

17. The processor as recited in claim 15 wherein the determination is the Nack response based on the reorder buffer having at least one instruction operation that causes interrupts to be masked.

18. The processor as recited in claim 15 wherein the determination is the Nack response based on the load/store unit having at least one load/store operation to a device address space outstanding.

19. A method comprising:
receiving an interrupt from a first interrupt source in an interrupt controller;
performing a first iteration of serially attempting to deliver the interrupt to a plurality of cluster interrupt controllers, wherein a respective cluster interrupt controller of the plurality of cluster interrupt controllers is associated with a respective processor cluster of a plurality of processor clusters, and wherein a given processor cluster of the plurality of processor clusters comprises a plurality of processors, wherein a given cluster interrupt controller of the plurality of cluster interrupt controllers, in the first iteration, is configured to attempt to deliver the interrupt to a subset of the plurality of processors in the respective processor cluster that are powered on without attempting to deliver the interrupt to ones of the plurality of processors in the respective processor cluster that are not included in the subset; and
based on non-acknowledge (Nack) responses from the plurality of cluster interrupt controllers in the first iteration, performing a second iteration over the plurality of cluster interrupt controllers by the interrupt controller, wherein the given cluster interrupt controller, in the second iteration, is configured to power on the ones of the plurality of processors that are powered off in the respective processor cluster and attempt to deliver the interrupt to the plurality of processors.

20. The method as recited in claim 19 wherein serially attempting to deliver the interrupt to the plurality of cluster interrupt controllers is terminated based on an acknowledge response from one of the plurality of cluster interrupt controllers.

* * * * *